(12) United States Patent
Deshpande et al.

(10) Patent No.: US 8,924,034 B2
(45) Date of Patent: Dec. 30, 2014

(54) ENERGY MANAGEMENT SYSTEM

(75) Inventors: Sachin G. Deshpande, Camas, WA (US); Louis Joseph Kerofsky, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 141 days.

(21) Appl. No.: 13/224,264

(22) Filed: Sep. 1, 2011

(65) Prior Publication Data
US 2013/0060391 A1 Mar. 7, 2013

(51) Int. Cl.
| | | |
|---|---|---|
| G01R 21/00 | (2006.01) | |
| G01R 31/36 | (2006.01) | |
| G05B 13/00 | (2006.01) | |
| G05D 23/00 | (2006.01) | |
| G06F 17/00 | (2006.01) | |
| G06F 17/10 | (2006.01) | |
| G05D 23/19 | (2006.01) | |
| F24F 11/00 | (2006.01) | |

(52) U.S. Cl.
CPC ..... *G05D 23/1924* (2013.01); *F24F 2011/0094* (2013.01); *F24F 2011/0016* (2013.01); *F21F 11/0015* (2013.01); *F24F 11/0009* (2013.01); *F24F 11/0012* (2013.01); *F24F 2011/0047* (2013.01)
USPC ............. 700/291; 700/276; 700/295; 702/61; 702/63; 703/2; 705/412

(58) Field of Classification Search
USPC ......... 700/276, 291, 295; 703/61, 2; 705/412; 702/61, 63
See application file for complete search history.

(56) References Cited

U.S. PATENT DOCUMENTS

| | | | | |
|---|---|---|---|---|
| 5,274,571 | A * | 12/1993 | Hesse et al. | 700/291 |
| 5,374,123 | A | 12/1994 | Bu | |
| 5,566,084 | A | 10/1996 | Cmar | |
| 6,185,483 | B1 * | 2/2001 | Drees | 700/295 |
| 6,402,043 | B1 | 6/2002 | Cockerill | |
| 6,477,518 | B1 | 11/2002 | Li et al. | |

(Continued)

FOREIGN PATENT DOCUMENTS

| | | |
|---|---|---|
| EP | 618098 A1 | 10/1994 |
| GB | 2448896 A * | 11/2008 |
| WO | WO 2011095922 A2 * | 8/2011 |

OTHER PUBLICATIONS

Kanchev, H. et al. "Energy Management and Operational Planning of a Microgrid With a PV-Based Active Generator for Smart Grid Applications." IEEE Transactions on Industrial Electronics 58.10 (2011): 4583-4592. Web. Oct. 11, 2013.*

(Continued)

*Primary Examiner* — Mohammad Ali
*Assistant Examiner* — Jennifer L Norton
(74) *Attorney, Agent, or Firm* — Chernoff Vilhauer McClung & Stenzel, LLP

(57) ABSTRACT

An energy management system includes a controller that receives a signal representative of current electrical generation. A storage source stores energy from the current electrical generation associated with the controller. The controller predicts the amount of storage of energy in said storage source over time, receives pricing information, includes a model of a temperature system of a building, and includes a comfort model of a user. The controller selects a desirable temperature based upon the current electrical generation, the stored energy, the pricing information, the building model, and the comfort model.

14 Claims, 30 Drawing Sheets

(56) References Cited

U.S. PATENT DOCUMENTS

| | | |
|---|---|---|
| 7,206,728 B2 | 4/2007 | Ozeki et al. |
| 7,331,191 B2 | 2/2008 | He et al. |
| 8,295,960 B2* | 10/2012 | Cooper et al. .................. 700/96 |
| 8,751,054 B2* | 6/2014 | Wang et al. .................. 700/291 |
| 8,774,976 B2* | 7/2014 | Mansfield .................. 700/291 |
| 2004/0159113 A1* | 8/2004 | Singh et al. .................. 62/129 |
| 2006/0200542 A1 | 9/2006 | Willig |
| 2007/0271006 A1 | 11/2007 | Golden et al. |
| 2009/0076790 A1* | 3/2009 | Fein et al. .................. 703/18 |
| 2009/0077397 A1 | 3/2009 | Shnekendorf et al. |
| 2009/0088907 A1 | 4/2009 | Lewis et al. |
| 2009/0216380 A1 | 8/2009 | Kolk |
| 2009/0216482 A1 | 8/2009 | Baker et al. |
| 2009/0216509 A1 | 8/2009 | Baker et al. |
| 2010/0004791 A1 | 1/2010 | West et al. |
| 2010/0174418 A1* | 7/2010 | Haugh .................. 700/295 |
| 2010/0262312 A1* | 10/2010 | Kubota et al. .................. 700/295 |
| 2011/0208360 A1* | 8/2011 | Oggianu et al. .................. 700/275 |
| 2011/0231320 A1* | 9/2011 | Irving .................. 705/80 |
| 2011/0270452 A1* | 11/2011 | Lu et al. .................. 700/291 |
| 2011/0307109 A1* | 12/2011 | Sri-Jayantha .................. 700/291 |
| 2013/0253719 A1* | 9/2013 | Kubota et al. .................. 700/291 |
| 2014/0095076 A1* | 4/2014 | Marwah et al. .................. 702/3 |

OTHER PUBLICATIONS

ANSI/ASHARE Standard 55-2004, Addenda a and b, "Thermal Environment Conditions for Human Occupancy," American Society of Heating, Refrigerating, and Air-Conditioning Engineers, 2004, 5 pgs.

J. van Hoof, "Forty years of Fanger's model of thermal comfort: comfort for all?," Indoor Air 2008, Mar. 24, 2008, pp. 182-201.

International Standard (ISO 7730) "Ergonomics of the thermal environmen—Analytical determination and interpretation of thermal comfort using calculation of the PMV and PPD indices and local thermal comfort criteria," Third Edition, Nov. 15, 2005, 57 pgs.

D.P. Chassin et al.,"GridLAB-D: An Open-source Power Systems Modeling and Simulation Environment," IEEE, 2008, 5 pgs.

* cited by examiner

US 8,924,034 B2

ENERGY MANAGEMENT SYSTEM

CROSS-REFERENCE TO RELATED APPLICATIONS

None.

BACKGROUND OF THE INVENTION

The present invention relates to an energy management system.

Increasing energy demands over time from factories, businesses, and homes has significantly increased the demands on the available energy resources. The available energy sources are, at times, reaching their limits to provide energy to their customers on a consistent and reliable basis.

To reduce the energy consumption, programmable thermostats permit users to program their heating and cooling systems to reduce the consumption during times when they are not home or otherwise it is not necessary. To further reduce the energy consumption, automatic timers permit users to program their lights so that they are only turned on when they are needed. Thus, various programmable devices are used to attempt to reduce the energy consumption or shift the time of use of energy.

In many cases, the users of energy have chosen to add electrical power generation sources, and in some cases the ability to store the energy generated for later usage. Such power generation sources, include for example, wind generators, water based generators, geothermal based generators, and photovoltaic panels. By monitoring the available energy from such power generation sources and predicting energy demands, the power usage may be modified in a suitable manner.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
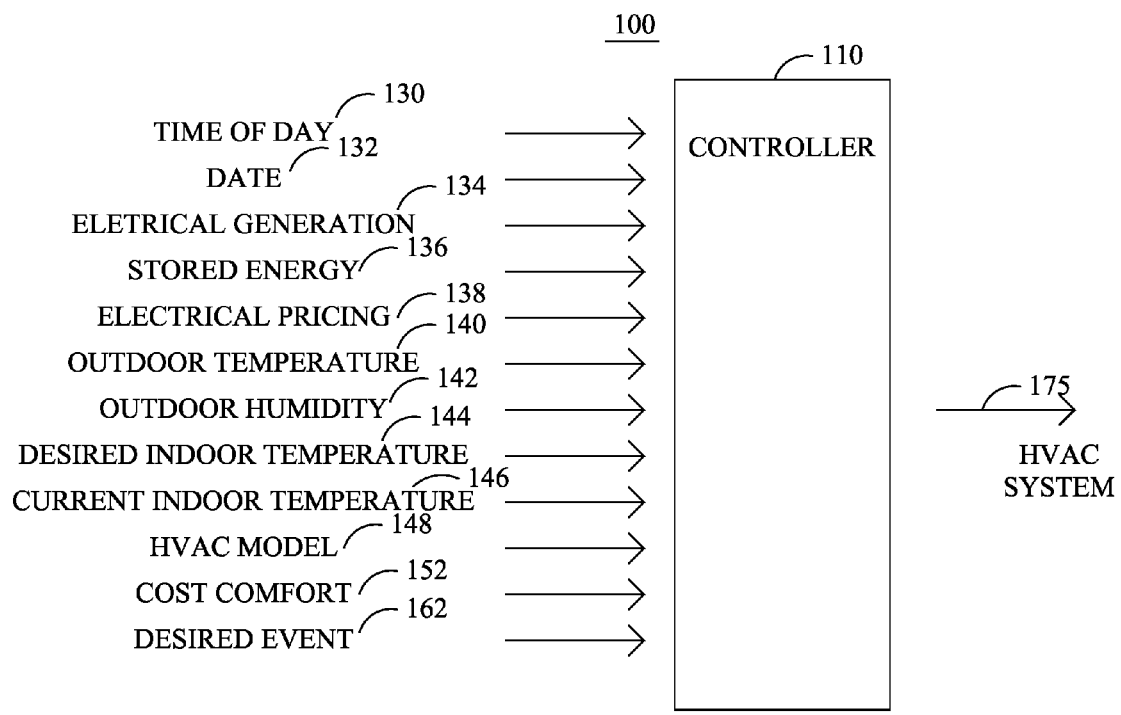
FIG. 1 illustrates an energy management system for a building.

Referring to FIG. 1, an energy management system 100 may include a controller 110. The controller 110 may be embodied in firmware and/or software on a dedicated device, embodied in software on a general purpose computing device, embodied in software operating on a network computing device including for example cloud computing, and/or may be embodied in any other suitable manner. The controller 110 may receive one or more of several different inputs 120.

The inputs 120 may include, for example, the time of the day 130, such as in hours, minutes, seconds, am, pm, morning, afternoon, evening, night, etc. The inputs 120 may include, for example, the date 132, such as day, month, year, spring, winter, fall, summer, etc. For example, the time and/or date may be in the form of {year, month, day, hour, minute, second}, such as {2009,9,21,18,25,58.4}.

The inputs 120 may include, for example, the current electrical generation 134, such as that available from a photovoltaic source, a water source, a windmill source, a ocean wave power source, a geothermal source, a generator, etc. Typically, the current electrical generation 134 is local for the particular control system, and in this manner is not generally shared with others directly. Although in many cases, the local electrical generation is provided to the electrical grid and thus available for others to use. Often the electric generation is stored, such as in a battery. For example, the current electrical generation 134 may provide varying energy over a period of time. For example, P_S(DL) may refer to received solar power (in kW); and P_PV(DL) may refer to generated electrical power (in kW).

Figure 2:
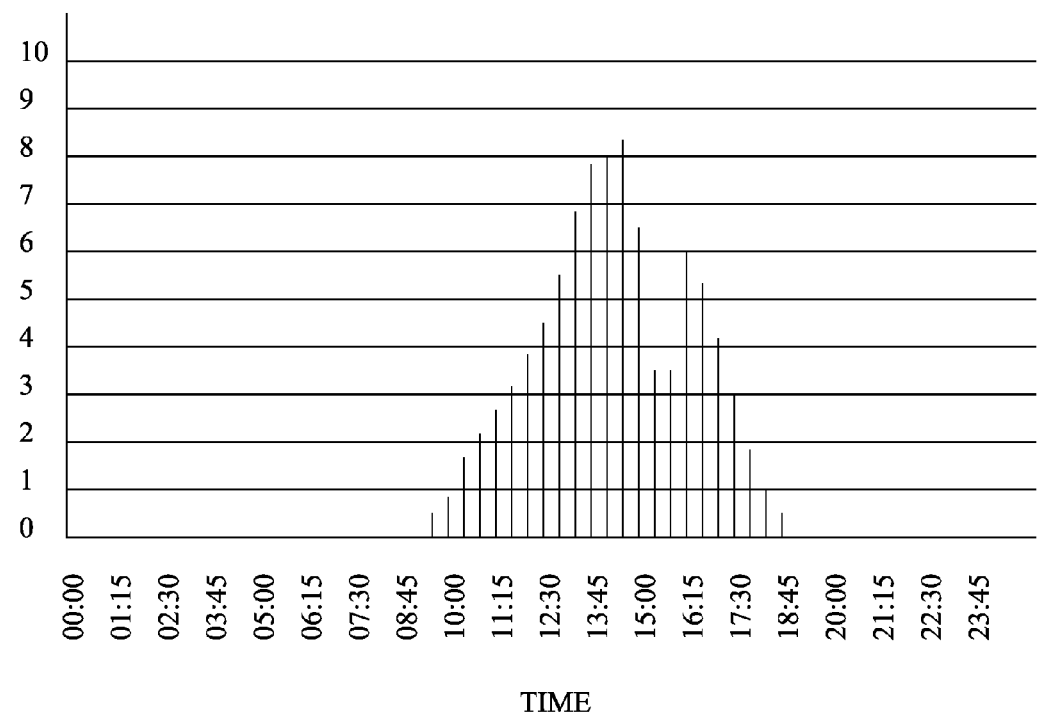
FIG. 2 illustrates intraday energy generation.

Referring to FIG. 2, an exemplary graph of intra-day energy generation is shown for a day, or otherwise over a period of time. The amount of energy generated tends to vary over the day, especially in the case of photovoltaic sources. Also, by using historical information or any other manner of prediction, the system may be able to predict the amount of energy likely to be generated over the day. The prediction for the particular day, may further be based upon the local weather, seasons, etc.

The inputs 120 may include, for example, the stored electric energy 136, such as that available from a battery source, etc.

Figure 3:
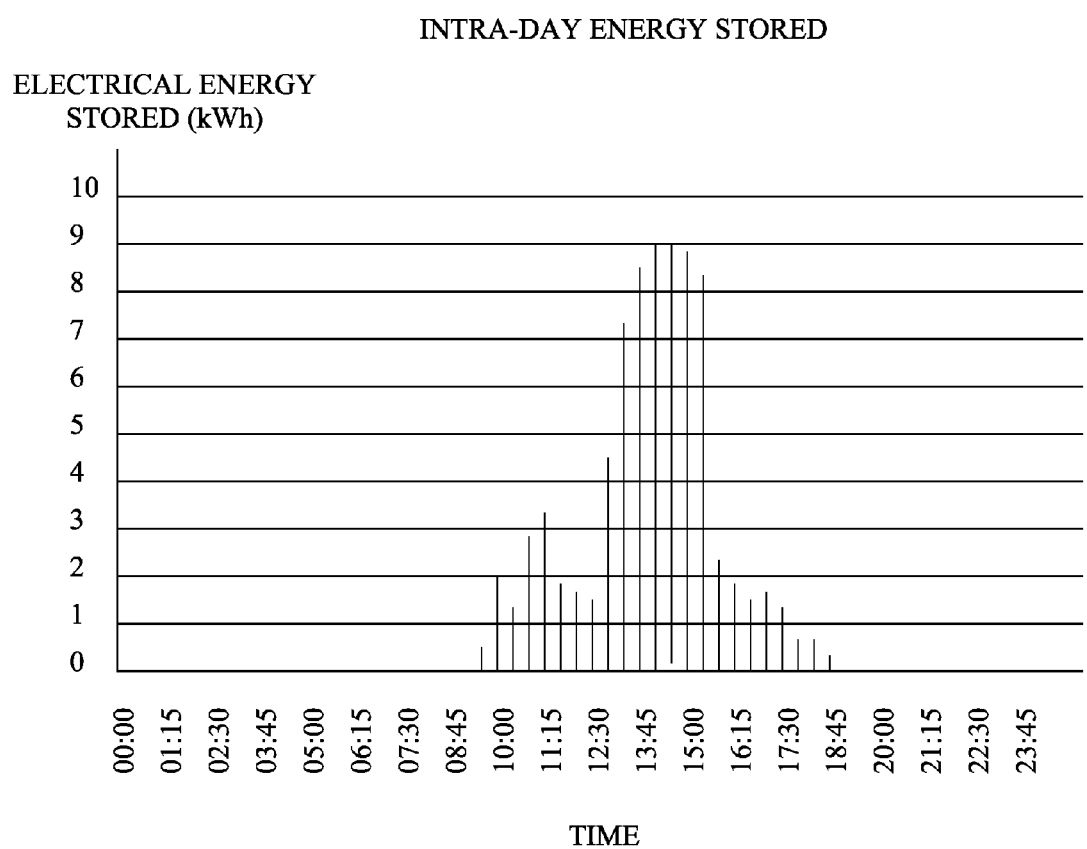
FIG. 3 illustrates intraday stored electrical energy.

Referring to FIG. 3, an exemplary graph of intra-day stored electric energy is shown for a day, or otherwise over a period of time. The amount of stored energy tends to vary over the day. Also, by using historical information or any other manner of prediction, the system may be able to predict the amount of stored energy likely to be available over the day.

Figure 4:
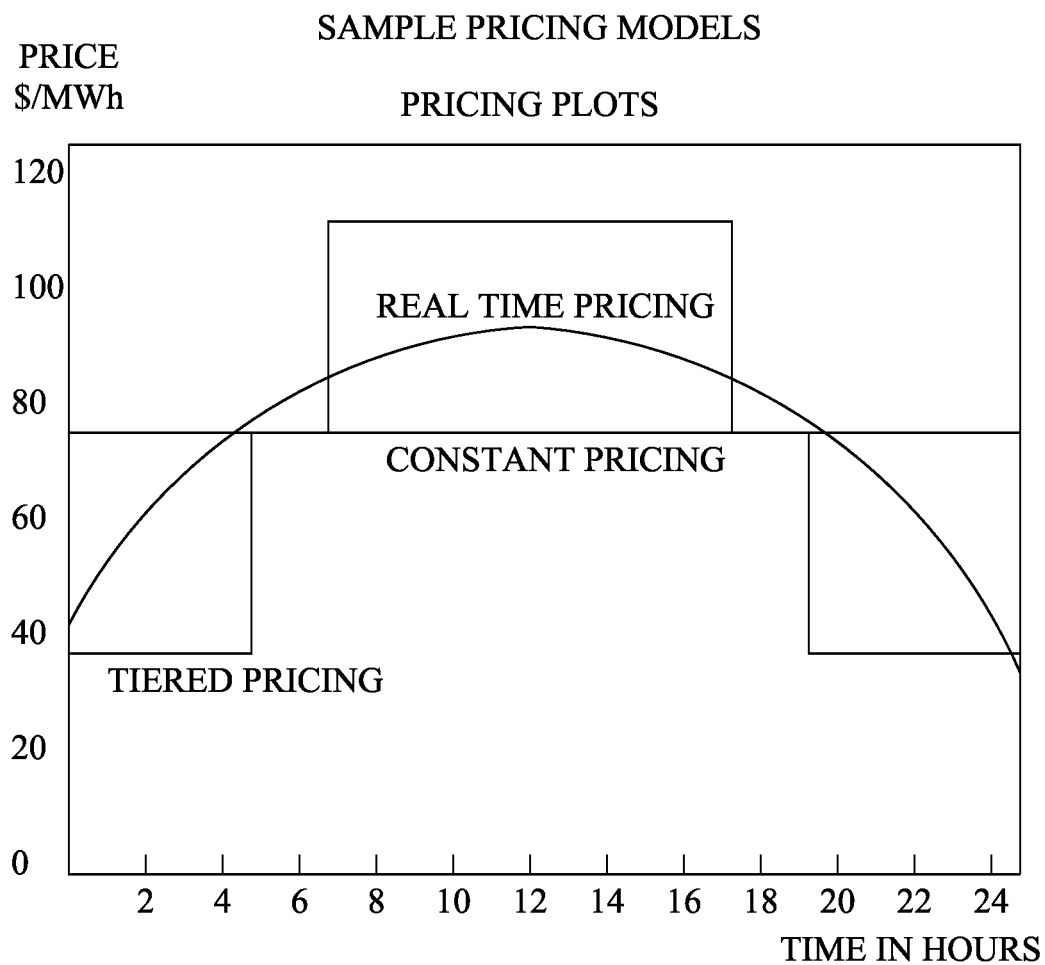
FIG. 4 illustrates energy pricing.

The inputs 120 may include, for example, the pricing of electricity 138, such as the historical pricing, the current pricing, the future pricing, time of use based pricing, etc. Referring to FIG. 4, for example, the current price of electrical energy typically varies with time during the day and/or day of the week. The electrical energy provider, such as the electric utility, may have a variety of different pricing models for electrical power. In some cases, the electrical energy has a constant pricing. In this case, the price may be characterized as C_g $ per kWH. In some cases, the electrical energy has a tiered pricing model, thus changing based upon the total energy usage during a period of time, such a monthly. In this case, the price may be characterized as C1_g $ per kWH while total energy consumption during the period is less than a threshold, and is modified to C1_g $ per kWH after the total usage for the time period that exceeds the threshold. Additional tiers may be used, as desired. In some cases, the electrical energy has a time of use model, where the price varies depending on the time it was consumed. In this case, the price may be characterized as C(DLi, DLi-1) as the price per kWH during the time interval [DLi-1,DLi]. In many cases, the electrical energy has a pricing model depending on more than one of the aforementioned factors, such as a time of use model further dependent on the usage history during a time period, such as a month. By way of example, the pricing may be C1(DLi, DLi-1) per kWH during the time interval [DLi-1, DLi] while total energy consumption during the month is less than a threshold kWH and changes to C1(DLi,DLi-1) per kWH during a time interval [DLi-1,DLi] after the total usage for the time period exceeds a threshold kWH.

The inputs 120 may include, for example, the current outdoor temperature 140, such as in degrees Fahrenheit or Celsius. For example, the current outdoor temperature may depend upon the climate. For example, T_out(DLi) may denote the current outdoor temperature on the day and time defined by DLi.

The inputs 120 may include, for example, the current outdoor humidity 142. For example, the current outdoor humidity may depend upon the climate. For example, H_out(DLi) may denote the current outdoor humidity on the day and time defined by DLi.

The inputs 120 may include, for example, the desired indoor temperature 144, such as in degrees Fahrenheit or Celsius. The desired indoor temperature may be selected by the user, if desired. For example, the desired indoor temperature may depend upon the climate. The desired indoor temperature may be denoted as T_target. A band of values may be defined either explcitiy (based on a user preference) or implicity (e.g., +/-2 degrees) as a thermostat deadband around the desired indoor temperature T_target. In addition, the T_target may vary, such as being based upon the day and time of day.

The inputs 120 may include, for example, the current indoor temperature 146, such as in degrees Fahrenheit or Celsius. For example, the current indoor temperature may be denoted as Tc, and obtained from a measurement.

Figure 5:
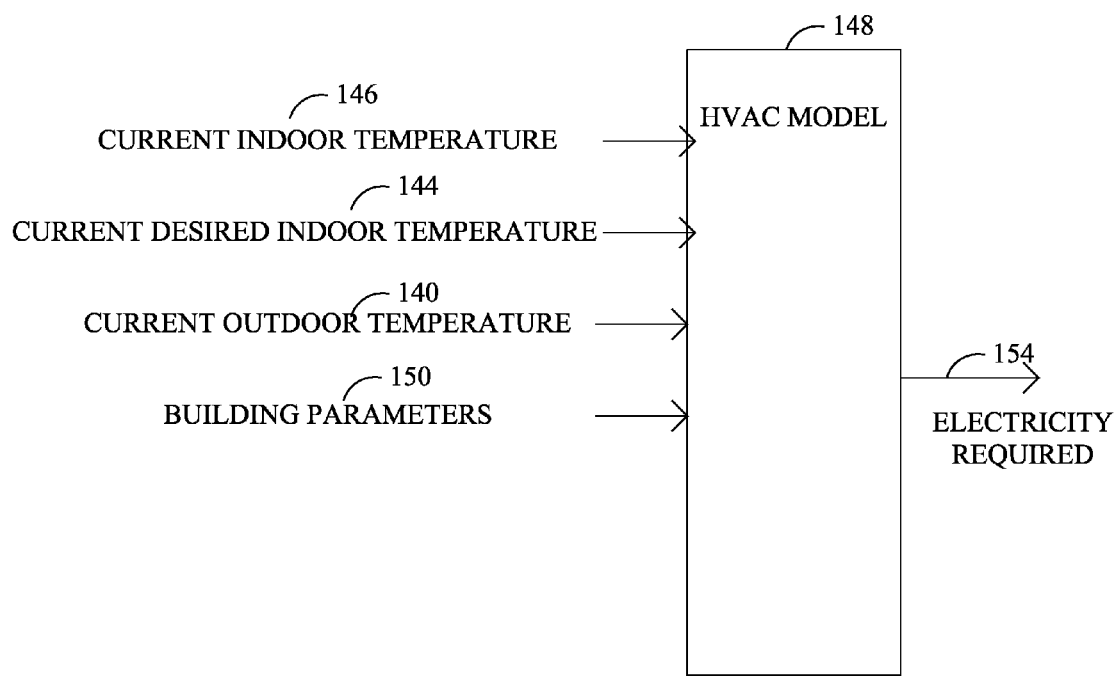
FIG. 5 illustrates a HVAC model.

The inputs 120 may include, for example, a model related to the HVAC system 148 (heating system and/or cooling system). Referring to FIG. 5, the model for the HVAC may be derived based on design criteria or based on observed observations of that or similar devices. The principal parameters that are preferably used for the HVAC model include, current outdoor temperature 140, candidate indoor temperature 146, desired indoor temperature 144, and building related parameters 150. Other parameters, may be used, as desired. The building related parameters, may include for example, floor area, air mass, air rate, internal gain, solar gain, etc. The HVAC model may be used to determine the energy required 154 to achieve the desired indoor temperature as function of one or more input parameters. For example, the principal parameters may be fine tuned using a learning system which uses information form an actual observed HVAC system behavior.

Figure 6:
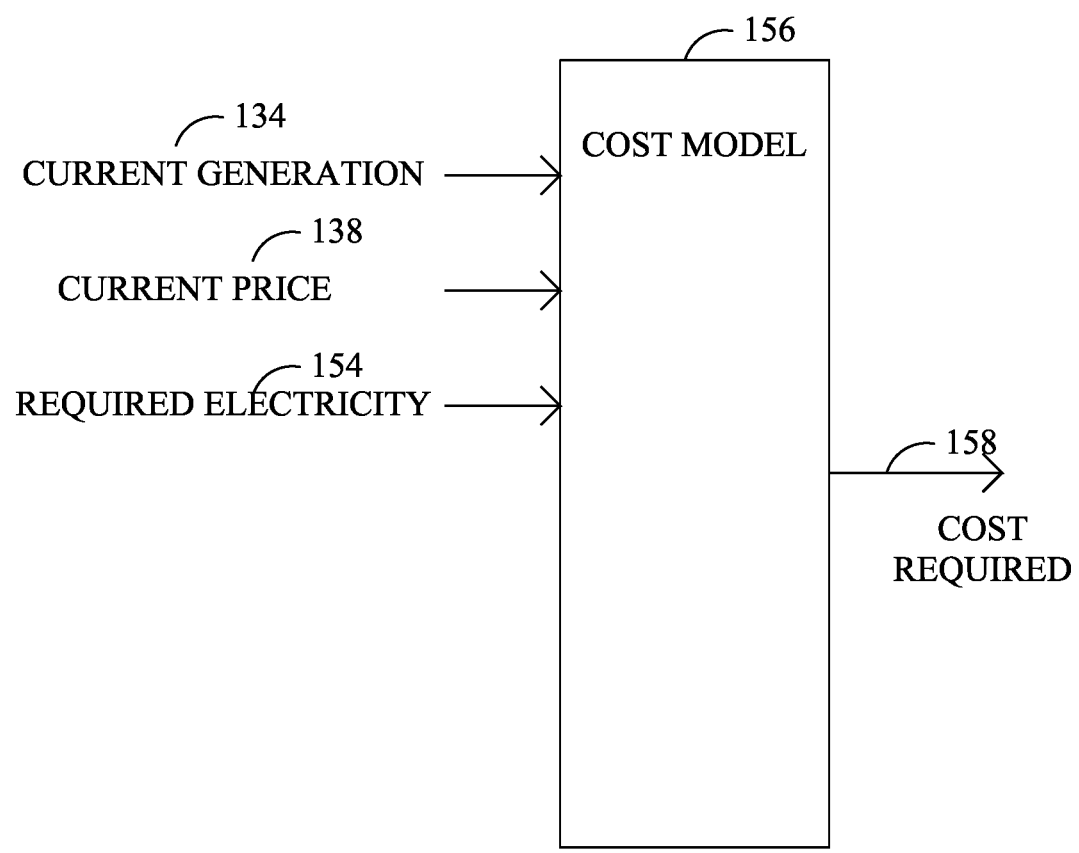
FIG. 6 illustrates a cost model.

Referring to FIG. 6, the energy required 154, together with the electrical pricing 138, and electrical generation 134 may be used by a cost model 156 to determine the anticipated cost required 158 to purchase sufficient electricity at the current price to meet the required electricity amount. Other parameters may likewise be used, such as for example, stored energy.

Figure 7:
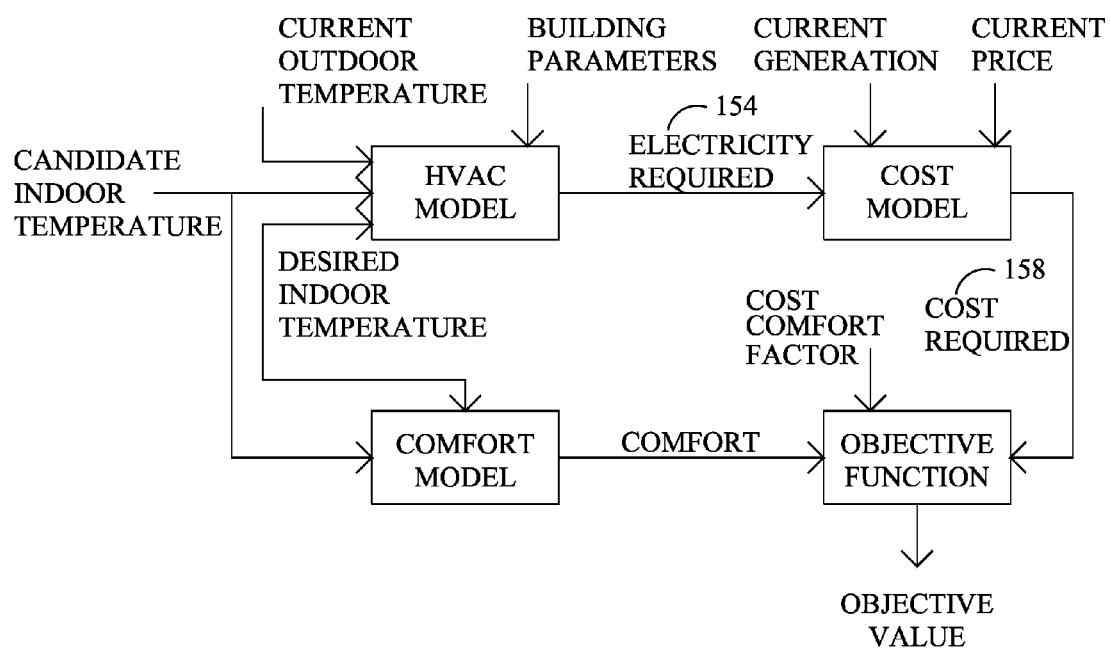
FIG. 7 illustrates a cost-temperature model.

Referring to FIG. 7, in constructing an optimization function for determining the temperature set point it is desirable to determine the cost and the comfort at each candidate set point. For each candidate, the cost may be the result of using the HVAC model illustrated in FIG. 5 to determine the electricity required 154 and then using a cost model to determine the cost required 158 for this candidate. Also, for each candidate, the system may determine a comfort factor based on a thermal conform function (see FIG. 19). The candidate which minimizes the cost comfort object function may be selected.

The inputs 120 may include, for example, a cost-comfort setting 152. The user may provide a setting, or a setting may otherwise be determined, which defines the desired cost sensitivity and/or desired comfort preference. In this manner, the amount of comfort and/or cost may be modified by the system based upon the user's selected preferences.

The inputs 120 may include, for example, a demand response event 162. The demand response event 162 may be signaled by an external provider, such as a utility company. In other cases, the event may be signaled by a proxy and/or server, such as based upon a signal from an external provider. In this manner, the amount of comfort, cost, and/or other settings for the system may be based upon such a demand response.

The controller 110, based upon receiving one or more of the inputs, 120 may provide a signal 175 to an associated HVAC system (heating system and/or cooling system) or other suitable controlling and/or recording system. The HVAC system changes the cooling and/or heating of the environment.

Referring again to FIG. 1, by way of example, the control system may select the temperature set point Tset by optimizing a discomfort-cost trade off function based upon the independent variable Tset given the parameters Tdesired, lambda (cost-discomfort trade-off factor). A suitable equation is illustrated as follows:

$$F(Tset, Tdesired, \lambda, Toutdoor, CurrentPrice) = Discomfort(Tset, Tdesired) + \lambda \cdot Cost(Energy(Tset, Toutdoor), CurrentPrice)$$

For example, the function may use a square error criteria for the discomfort and a power function for the energy as a function of Tset with additional parameters. An example is illustrated as follows:

$$F(Tset, Tdesired, \lambda, Toutdoor, CurrentPrice) = |Tset - Tdesired|^2 + \lambda \cdot Cost(Energy(Tset, Toutdoor), CurrentPrice)$$

where, Tdesired≤Tset≤Toutdoor

Figure 8:
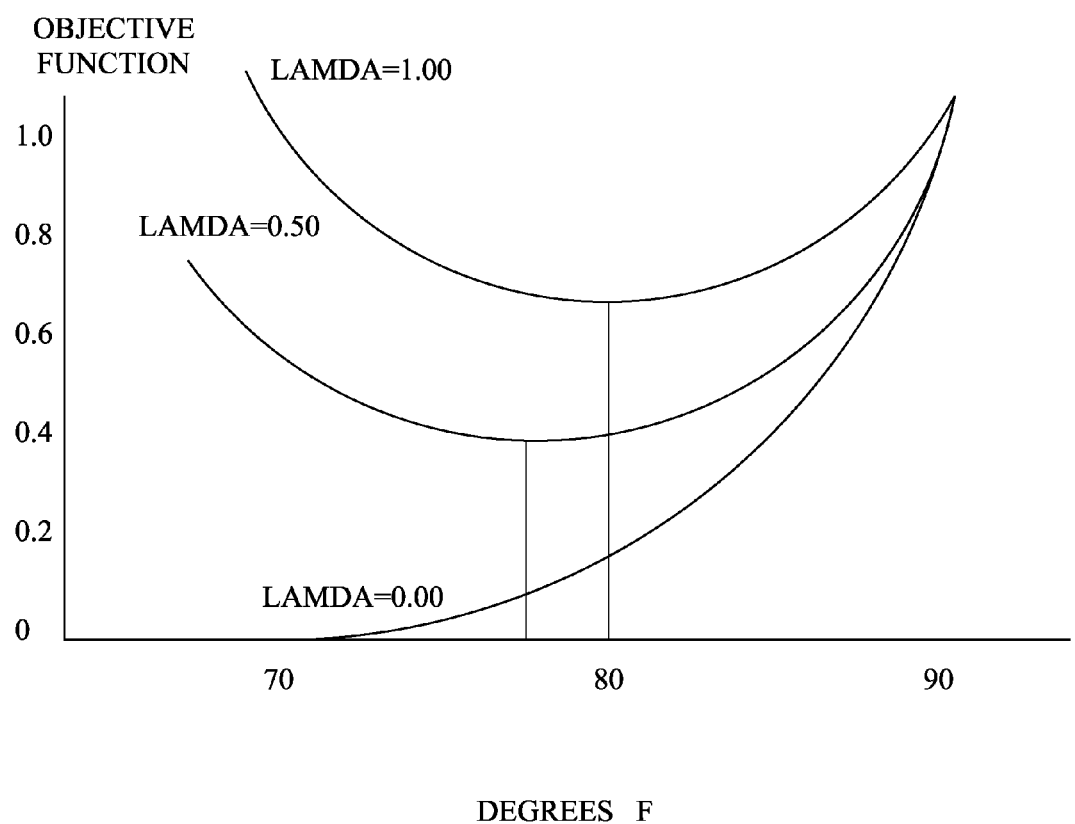
FIG. 8 illustrates a HVAC function for different lamda.

Referring to FIG. 8, a graph of the resulting functions for different Tdesired and lamda are illustrated for Tdesired=70 and Toutdoor=90. The Tset value may be determined by minimizing the function as indicated. The curves correspond to different values of lamda which lead to different optimal Tset values. Alternatively, the current indoor temperature, or other values, may also be used.

Figure 9:
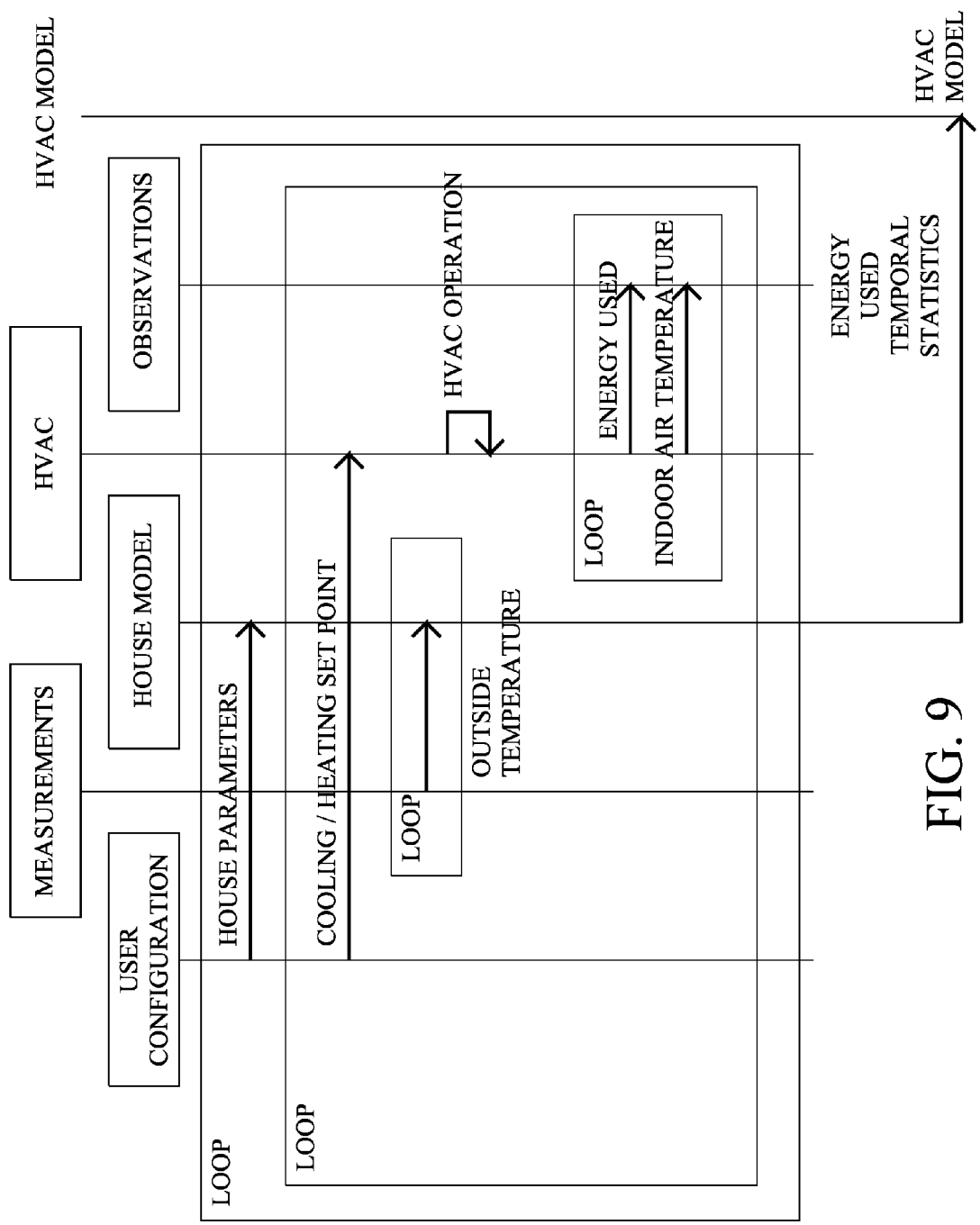
FIG. 9 illustrates a sequence diagram of HVAC modeling steps.

There are many techniques that may be used to characterize the HVAC model 148. Referring to FIG. 9, a suitable sequence diagram for a HVAC model estimation of energy consumption is illustrated based upon a set of user configuration parameters. The user configuration parameters may be building related parameters, heading related parameters such as the set point, and cooling related parameters such as the set point. The user configuration parameters may be selected by the user, or otherwise generated by the system in any suitable manner. For example, the building parameters may be listed in order of having the greatest likelihood of impact on the performance of the system, such as for example, (1) the floor area (in square feet) of the building; (2) the inside air temperature; (3) the humidity; (4) insulation factor for the building; (5) air change per hour; (6) air mass; (7) air density; (8) air thermal mass; (9) air heat capacity; etc.

The modeling may be performed by selecting typical values for the parameters, either by the user, semi-automatically, or automatically in some manner, such as a default value. Further, the values for one or more of the parameters may be based upon another one or more of the parameters. For example, the selected house size may be used to model other parameters for the selected house size. In addition, based upon the selected cooling and/or heating set points, a set of modeling parameters for each house size may be selected [HS1, . . . , HSm] for the various cooling and/or heating set point values [CSP1, . . . , CSPn].

The measurement parameters may refer to items that are measured. Such parameters may include, for example, the outside temperature, the inside temperature, the humidity, the solar gain, etc. In addition, the outside temperature, the inside temperature, the humidity, the solar gain, etc., may include a profile that is based upon the time of the day, the time of the year, the season, or otherwise.

The model of the building may be simulated using a set of parameters, developed based upon simulations for other buildings, and/or modeled based upon simulations of the current building.

By way of example, the HVAC may include a heating, cooling, and off state. A pseudo-code describing the behavior may be as follows:

```
//CSP = Cooling setpoint
//HSP = Heating setpoint
//DB = Thermostat Deadband
// e= 1e-6;
Tcn = CSP+DB;
Tcf = CSP-DB;
Thn = HSP-DB;
Thf = HSP+DBd;
if(Check(Tcn, Tcf, Thn, Thf))
{
    if (Tinside<=Thn+e // heating turns on
        {State = HEATING;}
    else if (Tinside>=Thf-e && Tinside<=Tcf+e)
        {State = Off;}
    else if (Tinside>=Tcn-e) // cooling turns on
        {State = COOLING;}
}
Check(Tcn, Tcf, Thn, Thf)
{
    if(Tcf<Thf) return FALSE;
    return TRUE
}
```

The system primarily observes the amount of energy used by the HVAC system during different time intervals, and the indoor air temperature, and the time during which the HVAC is in heating, cooling, and/or off state during such time intervals.

By way of example, a linear estimation equation for heating may be characterized as:

$$E = n_i T_{out} + d_i$$

where the values of $n_i$ and $d_i$ may be as follows:

|            | 66        | 70        | 74        | 78        |
|------------|-----------|-----------|-----------|-----------|
| CSP HS - $n_i$ |           |           |           |           |
| 2000       | 1.8495    | 2.1136    | 2.2566    | 2.3100    |
| 2500       | 2.2664    | 2.6026    | 2.6585    | 2.4954    |
| 3000       | 2.4094    | 2.8154    | 2.7729    | 2.5551    |
| CSP HS - $d_i$ |           |           |           |           |
| 2000       | -113.5461 | -145.1054 | -163.5304 | -179.1046 |
| 2500       | -144.9921 | -186.1154 | -196.5964 | -193.1568 |
| 3000       | -153.3721 | -201.8932 | -204.4271 | -196.4579 |

For example, the system may interpolate or otherwise estimate in some manner the anticipated energy consumption for other building sizes based upon the modeled building size. If desired, the slope and intercept values may be approximated to be the same independent of the set points, thus $n_1 = n_2 = \ldots = n$ and $d_1 = d_2 = \ldots = d$. Also, the constants (slope and intercept) may be modified based upon a learning technique which actively and/or passively records actual energy consumption measurements and parameters for one or more buildings.

Figure 10:
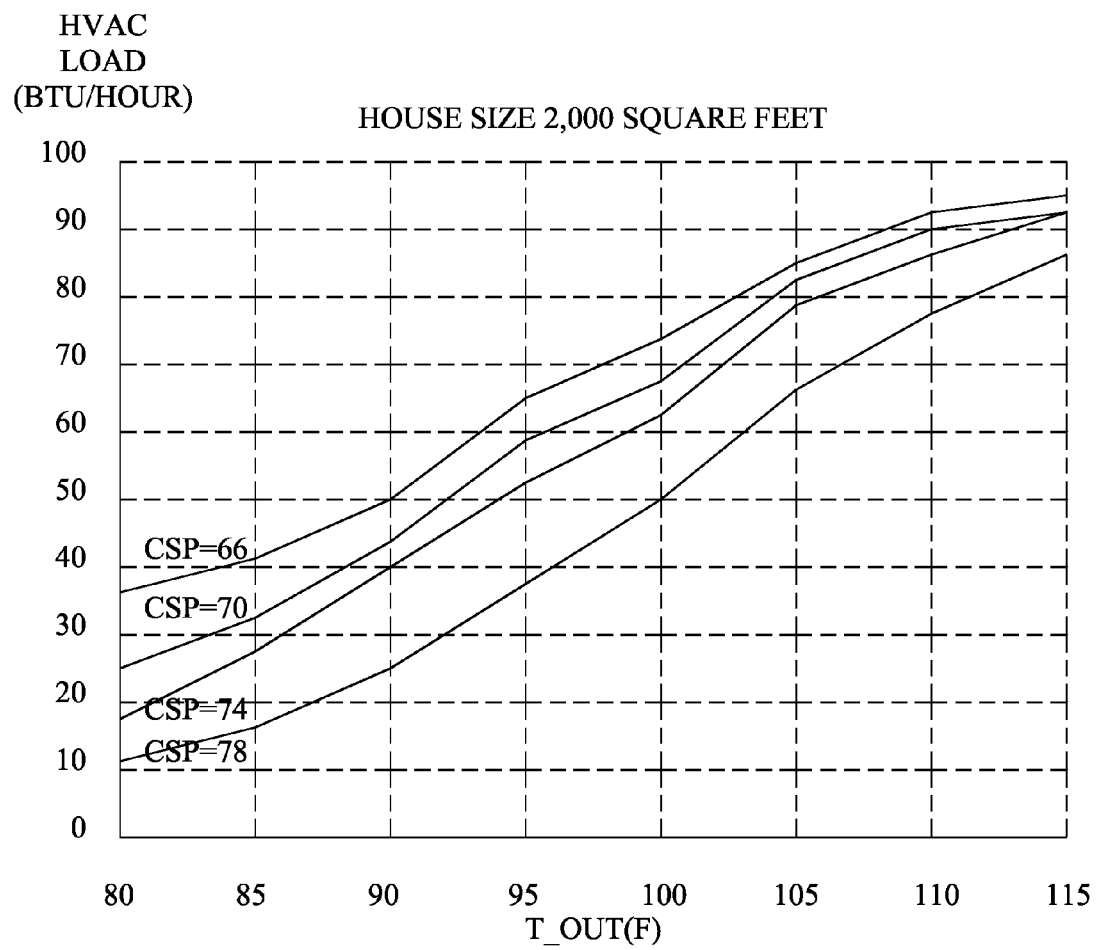
FIG. 10 illustrates a HVAC load as a function of outside air temperature for different cooling set points, for house size of 2000 square feet.
Figure 11:
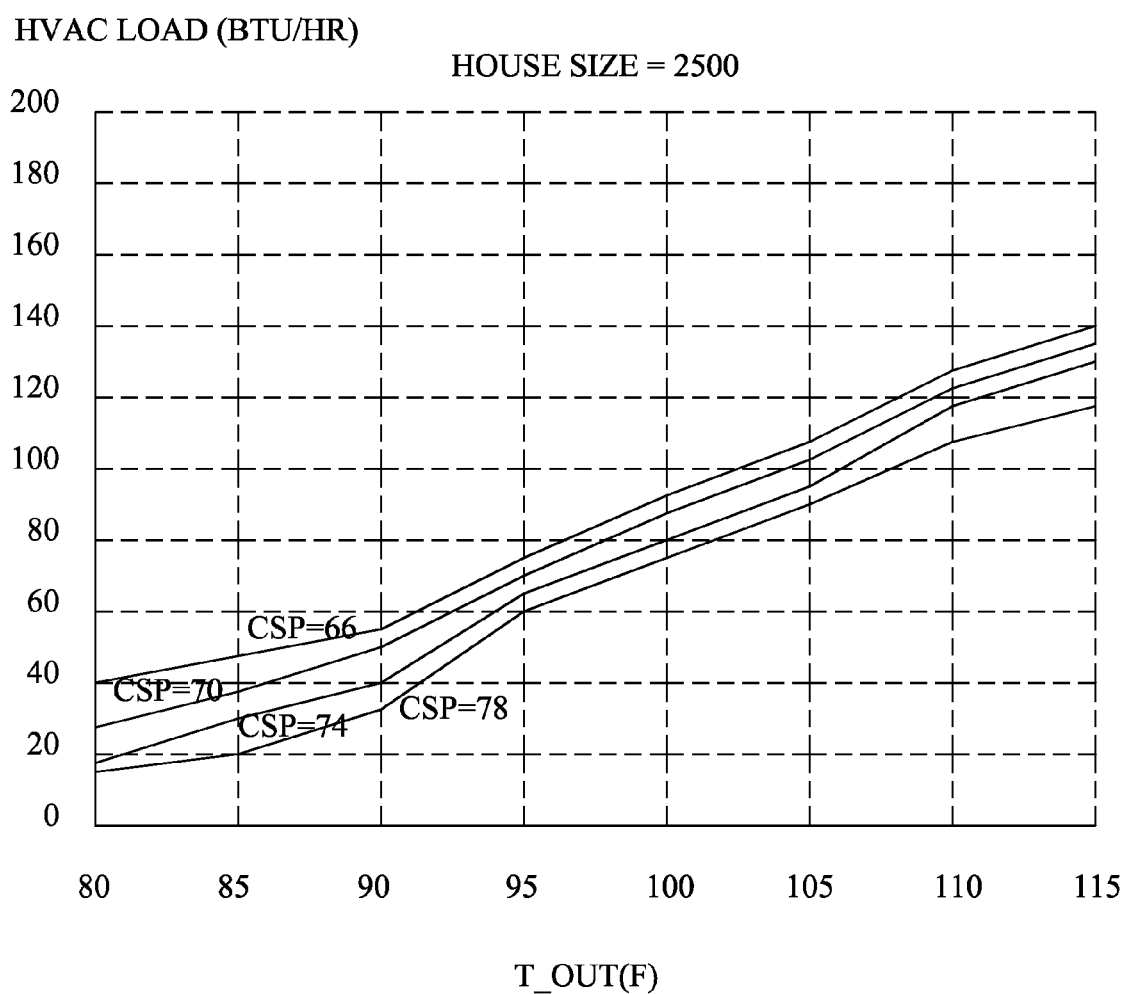
FIG. 11 illustrates a HVAC load as a function of outside air temperature for different cooling set points, for house size of 2500 square feet.
Figure 12:
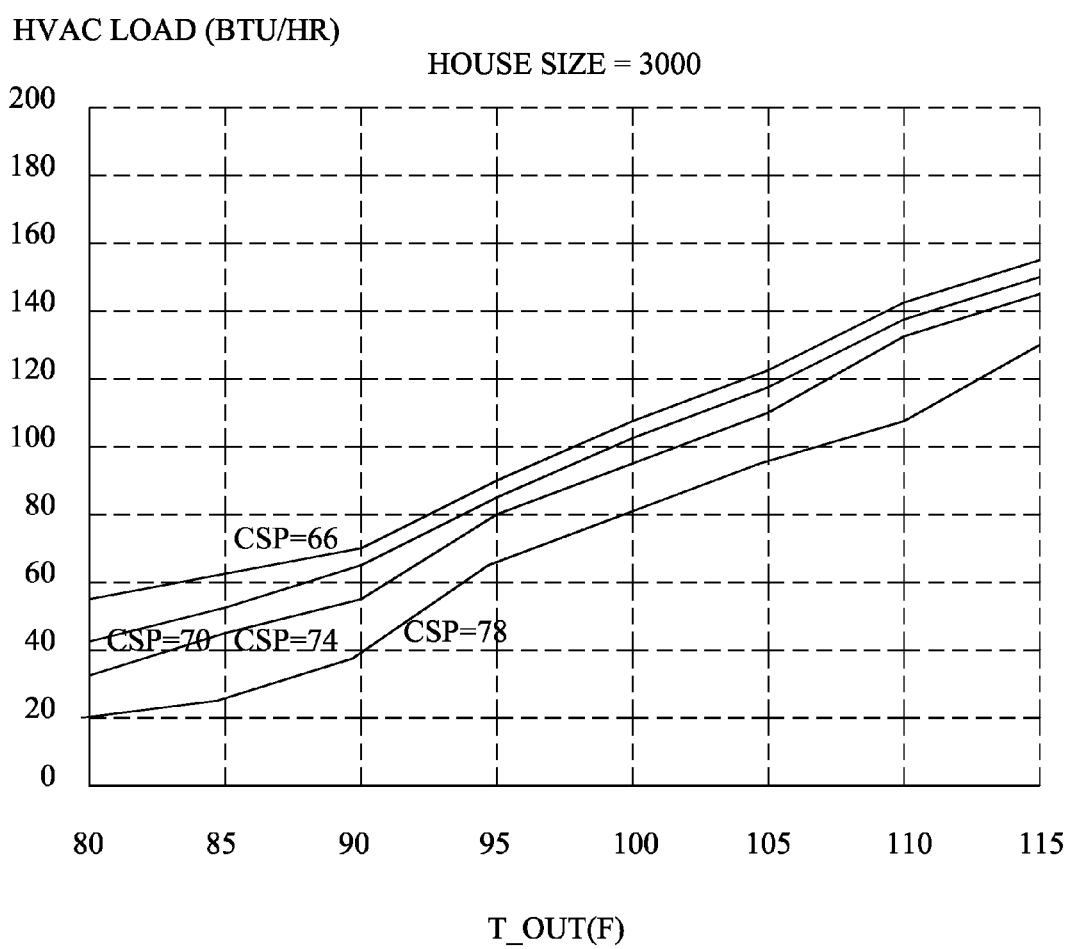
FIG. 12 illustrates a HVAC load as a function of outside air temperature for different cooling set points, for house size of 3000 square feet.

FIG. 10, FIG. 11, and FIG. 12, illustrate exemplary HVAC load estimates as a function of outside temperature and several different set points, for different building sizes. As illustrated, the load estimate increases as a function of building size and temperature.

By way of example, a linear estimation equation for cooling may be characterized as:

$$E = m_i CSP + c_i$$

where the values of $m_i$ and $c_i$ may be as follows:

| $T_{out}$ HS $m_i$ | 80 | 85 | 90 | 95 | 100 | 105 | 110 | 115 |
|---|---|---|---|---|---|---|---|---|
| 2000 | −1.9635 | −1.9492 | −2.0798 | −2.2293 | −1.8250 | −1.5725 | −1.1467 | −0.5250 |
| 2500 | −2.2425 | −2.1477 | −2.3812 | −2.3487 | −2.0170 | −2.0502 | −1.6367 | −1.6822 |
| 3000 | −2.3605 | −2.3497 | −2.5668 | −2.5805 | −2.3870 | −2.3870 | −1.8825 | −2.2167 |

| $T_{out}$ HS $c_i$ | 80 | 85 | 90 | 95 | 100 | 105 | 110 | 115 |
|---|---|---|---|---|---|---|---|---|
| 2000 | 163.3220 | 169.1135 | 189.2845 | 213.5085 | 194.4750 | 189.9300 | 168.7185 | 129.3400 |
| 2500 | 185.4800 | 187.0105 | 214.5725 | 225.7025 | 213.1390 | 229.2955 | 214.7935 | 231.2195 |
| 3000 | 197.0610 | 204.2845 | 231.2135 | 244.4210 | 238.3810 | 258.3140 | 236.5000 | 278.9635 |

For example, the system may interpolate or otherwise estimate in some manner the anticipated energy consumption for other building sizes based upon the modeled building size. If desired, the slope and intercept values may be approximated to be the same independent of the set points, thus $m_1 = m_2 = \ldots = m$ and $c_1 = c_2 = \ldots = c$. Also, the constants (slope and intercept) may be modified based upon a learning technique which actively and/or passively records actual energy consumption measurements and parameters for one or more buildings.

Figure 13:
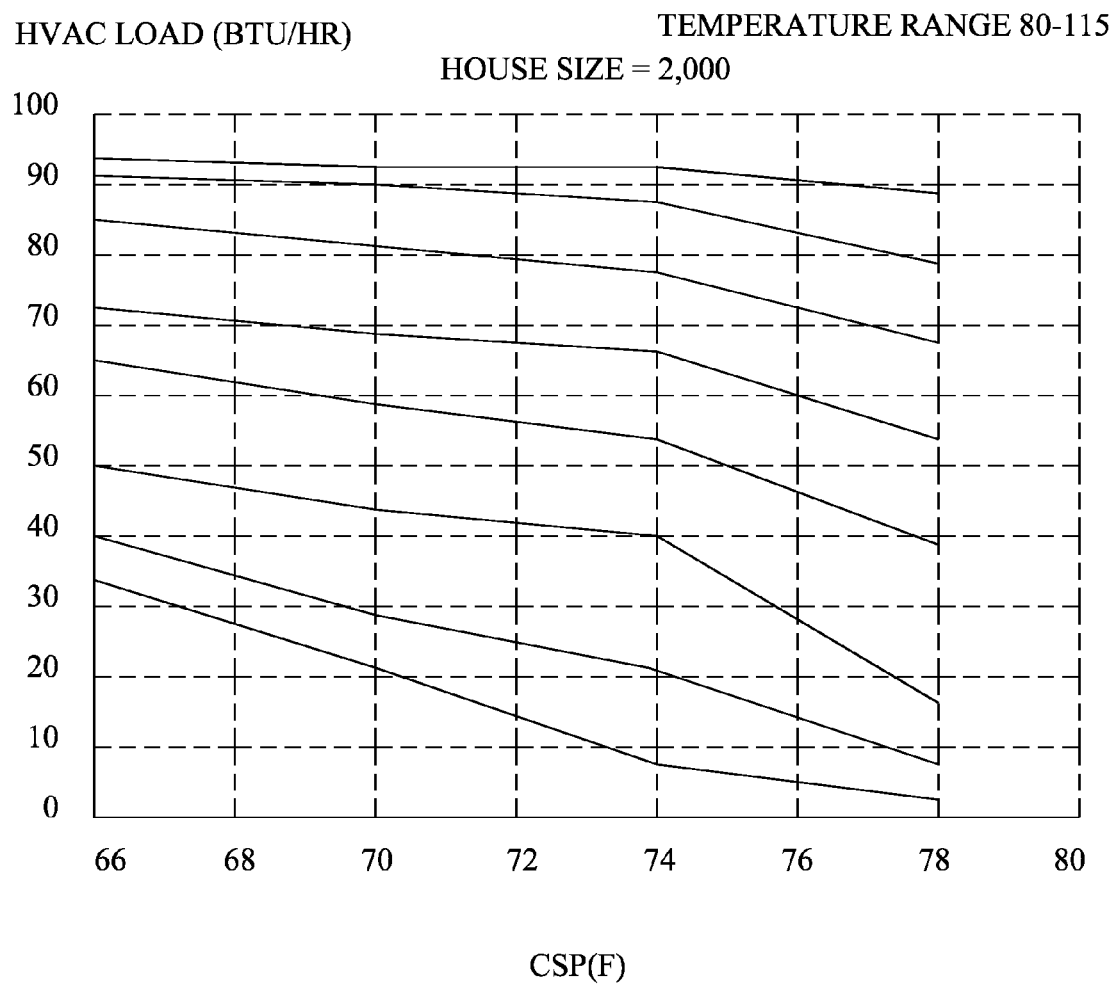
FIG. 13 illustrates a HVAC load as a function of cooling set-point temperature for different outside air temperature, for house size of 2000 square feet.
Figure 14:
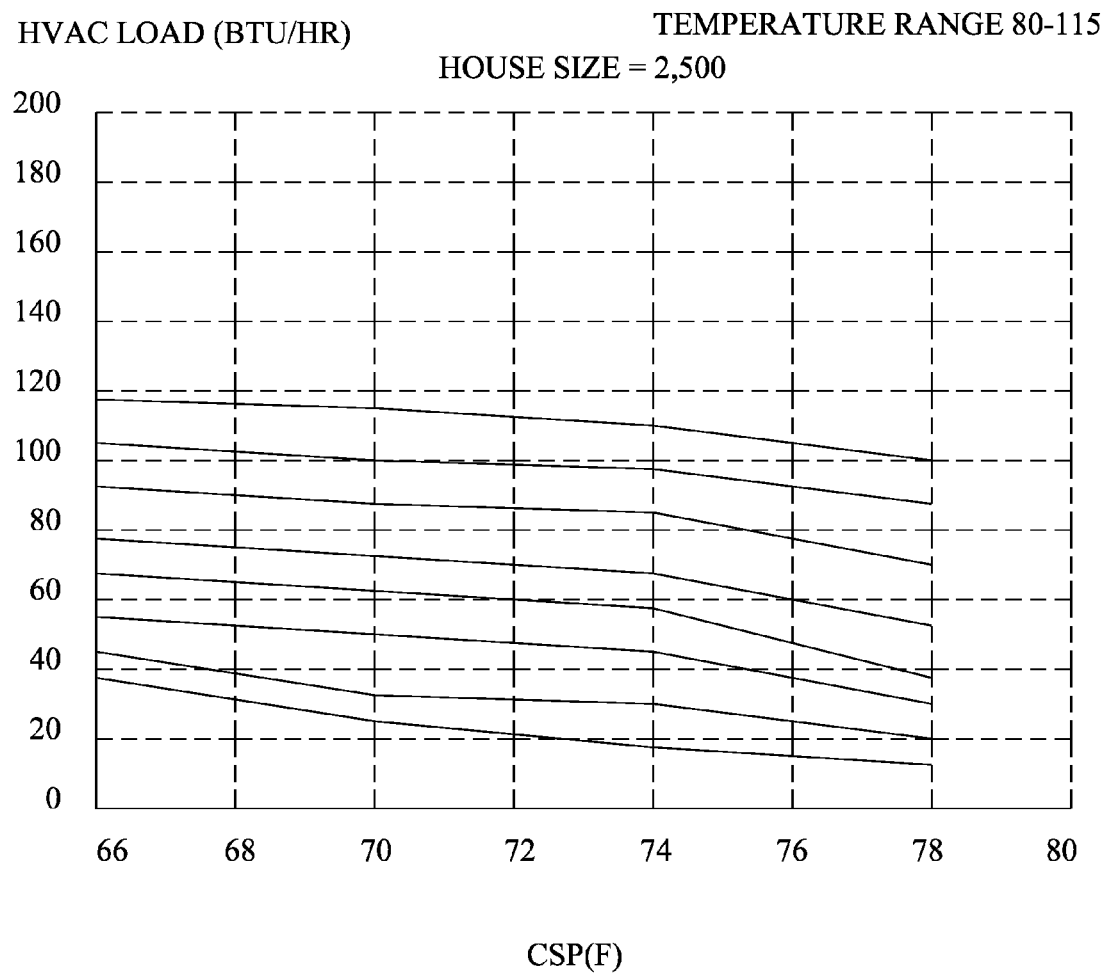
FIG. 14 illustrates a HVAC load as a function of cooling set-point temperature for different outside air temperature, for house size of 2500 square feet.
Figure 15:
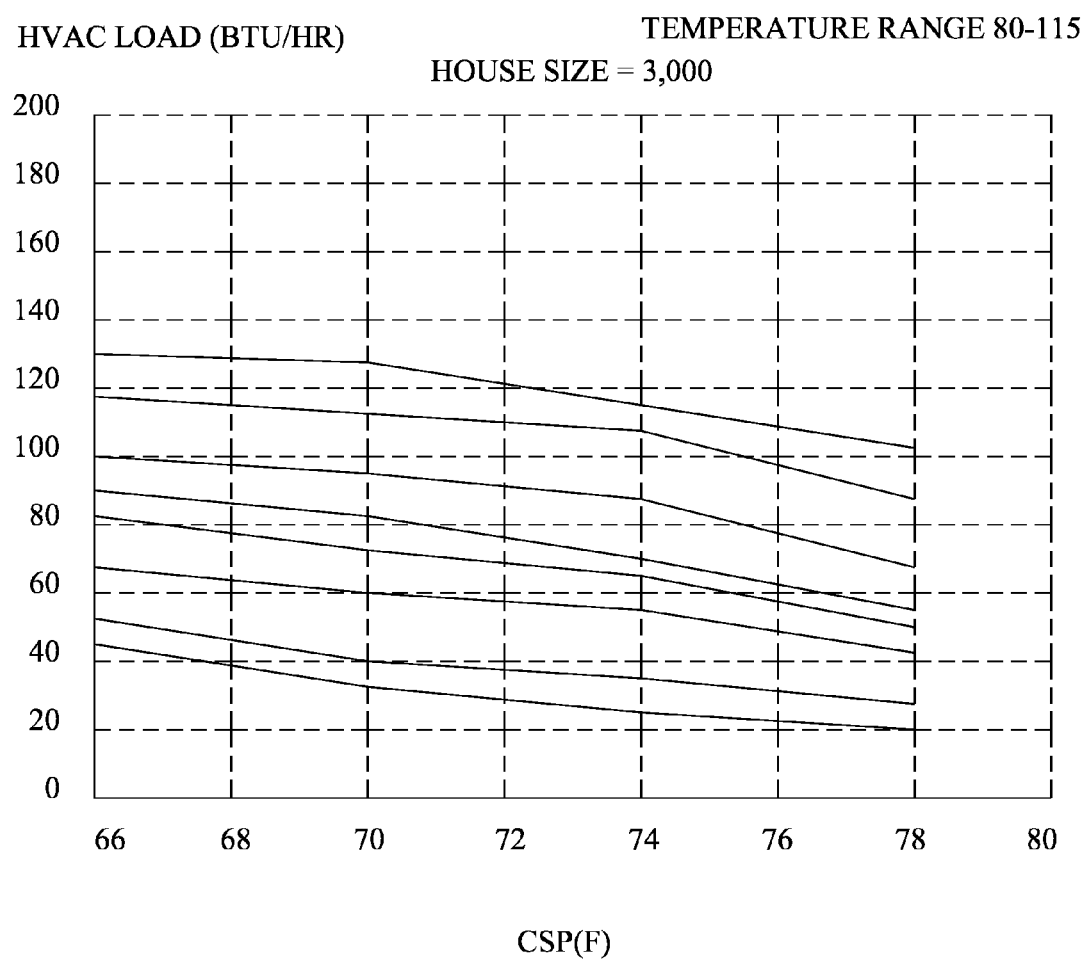
FIG. 15 illustrates a HVAC load as a function of cooling set-point temperature for different outside air temperature, for house size of 3000 square feet.

FIG. 13, FIG. 14, and FIG. 15, illustrate exemplary HVAC load estimates as a function of outside temperature and several different set points, for different building sizes. As illustrated, the load estimate decreases as a function of building size and temperature. There are many techniques that may be used to characterize the thermal comfort model. The thermal comfort model may be selected based upon a variety of factors. For example, some of the factors may include (1) metabolic rate; (2) clothing insulation; (3) air temperature; (4) radiant temperature; (5) air speed; and (6) relative humidity. For each of the factors a value may be selected, such as for example, +3 hot; +2 warm; +1 slightly warm; 0 neutral; −1 slightly cool; −2 cool; −3 cold. One characterization is the ASHRAE standard (ANSI/ASHRAE Standard 55-2004, "Thermal Environmental Conditions for Human Occupancy," American Society of Heating, Refrigerating, and Air-Conditioning Engineers, 2004), incorporated by reference herein.

The modeling may be performed by selecting typical values for the parameters, either by the user, semi-automatically, or automatically in some manner, such as a default value. Further, the values for one or more of the parameters may be based upon another one or more of the parameters. For example, the selected house size may be used to model other parameters for the selected house size. In addition, based upon other values, a set of parameters may be selected.

The model for the thermal comfort model may use a low parameter mode, which defines a comfort value between [0,1] as a function of the current season (summer, winter, fall, spring), the relative humidity, and the air temperature. Preferably, the system may presume that the user will automatically modify their clothing based upon the current season. For simplicity, the system may use clo=1 (winter), and clo=0.5 (summer).

Figure 16:
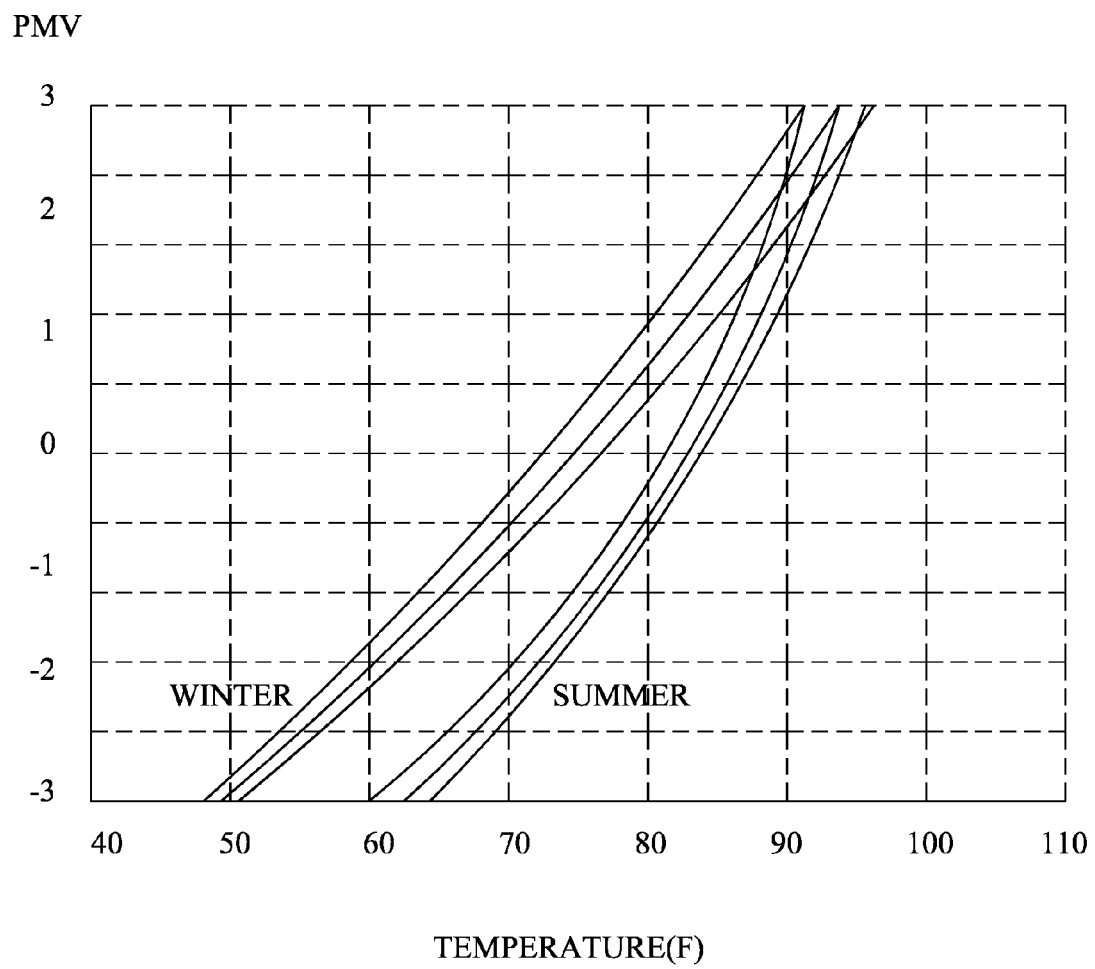
FIG. 16 illustrates predicted mean vote index.
Figure 17:
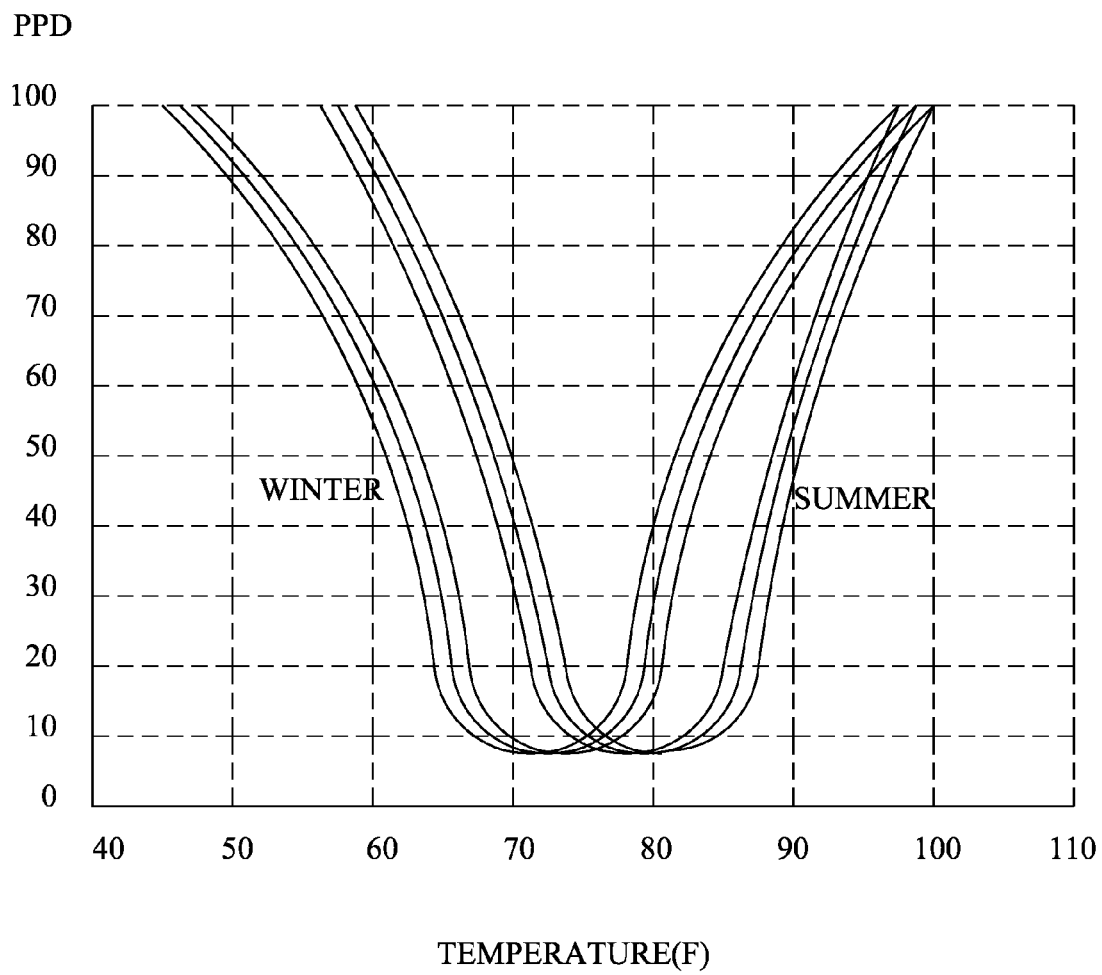
FIG. 17 illustrates predicted percentage of dissatisfied.

To define the thermal comfort function, the system may calculate a PMV (predicted mean vote) and a PPD (percentage of dissatisfaction) function for the current season for different relatively humidity values as a function of air temperature, which models the user's likely comfort. One exemplary example may be as follows:

$PMV = ts*(mw - hl1 - hl2 - hl3 - hl4 - hl5 - hl6)$;

$ts = (0.303e^{(-0.036*m)} + 0.028)$;

$hl1 = 3.05*0.001*(5733 - 6.99*mw - pa)$;

$hl2 = 0.42*(mw - 58.15)$; if $mw > 58.15$ $hl2 = 1$; otherwise $hl3 = 1.7*0.00001*m*(5867 - pa)$;

$hl4 = 0.0014*m*34 - ta)$;

$hl5 = 3.96*fcl*(xn4 - (tra/100)^4)$;

$hl6 = fcl*hc*(tcl - ta)$;

$PPD = 100 - 95e^{(-0.03353PMV^4 - 0.2179(PMV*PMV))}$;

where:
ts=thermal sensation transfer coefficient
mw=internal heat production
hl1=heal loss through skin
hl2=heat loss by sweating
hl3=heat loss due to latent respiration
hl4=heat loss due to dry respiration
hl5=heat loss by radiation
hl6=heat loss by convection Referring to FIG. 16, an exemplary predicted mean vote (PMV) index for clo=1 (winter) and clo=0.5 (summer) for different relatively humidity (RH) values is illustrated. Referring to FIG. 17, an exemplary predicted percentage of dissatisfied (PPD) index for clo=1 (winter) and clo-0.5 (summer) for different relative humidity (RH) values are illustrated.

Figure 18:
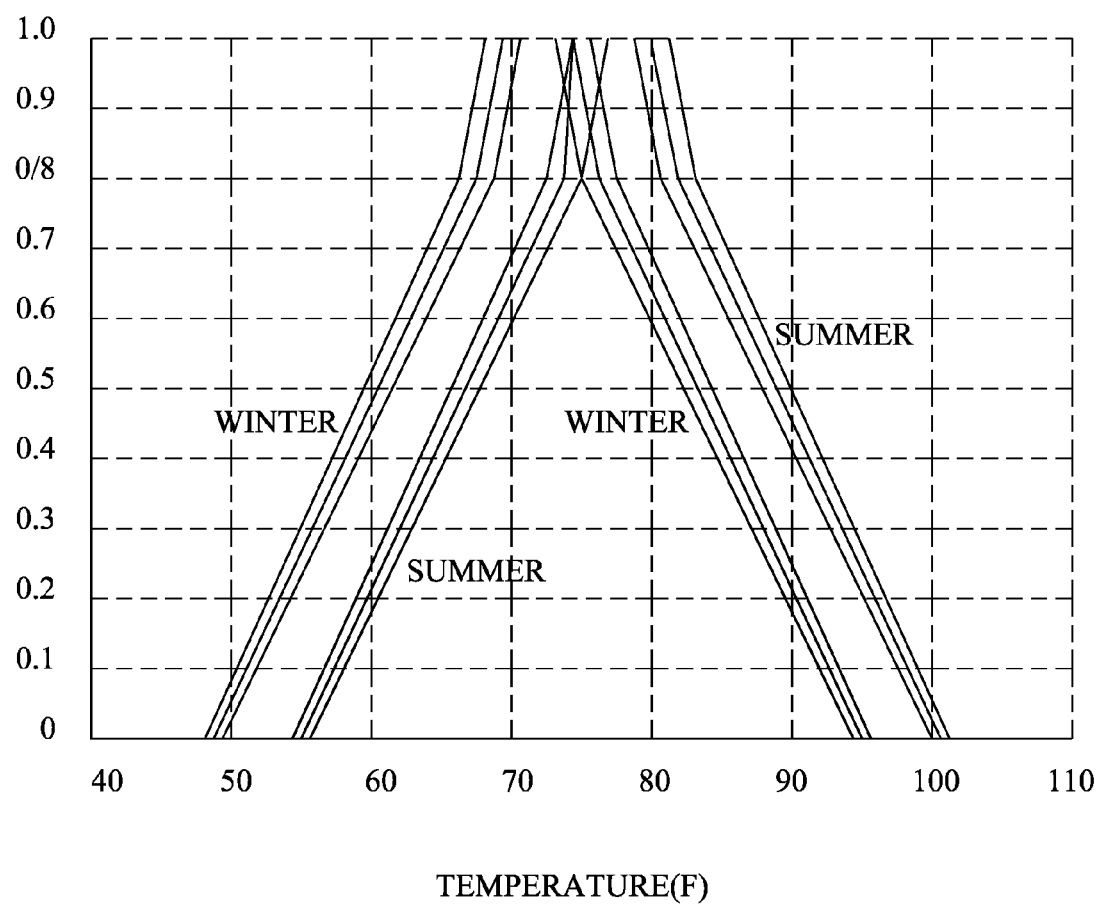
FIG. 18 illustrates thermal comfort functions for a first family.

Any suitable thermal comfort function family may be based upon the PMV function. One exemplary manner of calculating a thermal comfort function is illustrated below, and shown in FIG. 18. In this case, the thermal function is calculated by providing a "full comfort" value in the case the PMV value is within [−0.5, 0.5] and the PPD is <10%.

```
//pmv = Predicted Mean Vote Index
//ppd = Predicted Percentage of Dissatisfied
//TC = Thermal Comfort Function
for clo=0.5:0.5:1;
    For rh=25:25:75;
        for t=Ti:1:Ti+N;
            TC(t)=1-abs(pmv(t))./3;
            checkAndSetTC(TC(t),pmv(t),ppd(t));
        end;
    end;
end;
checkAndSetTC(TC,pmv,ppd);
{
    if(-0.5<pmv<0.5 && ppd <10));
        TC=1;
    end;
}
```

Figure 19:
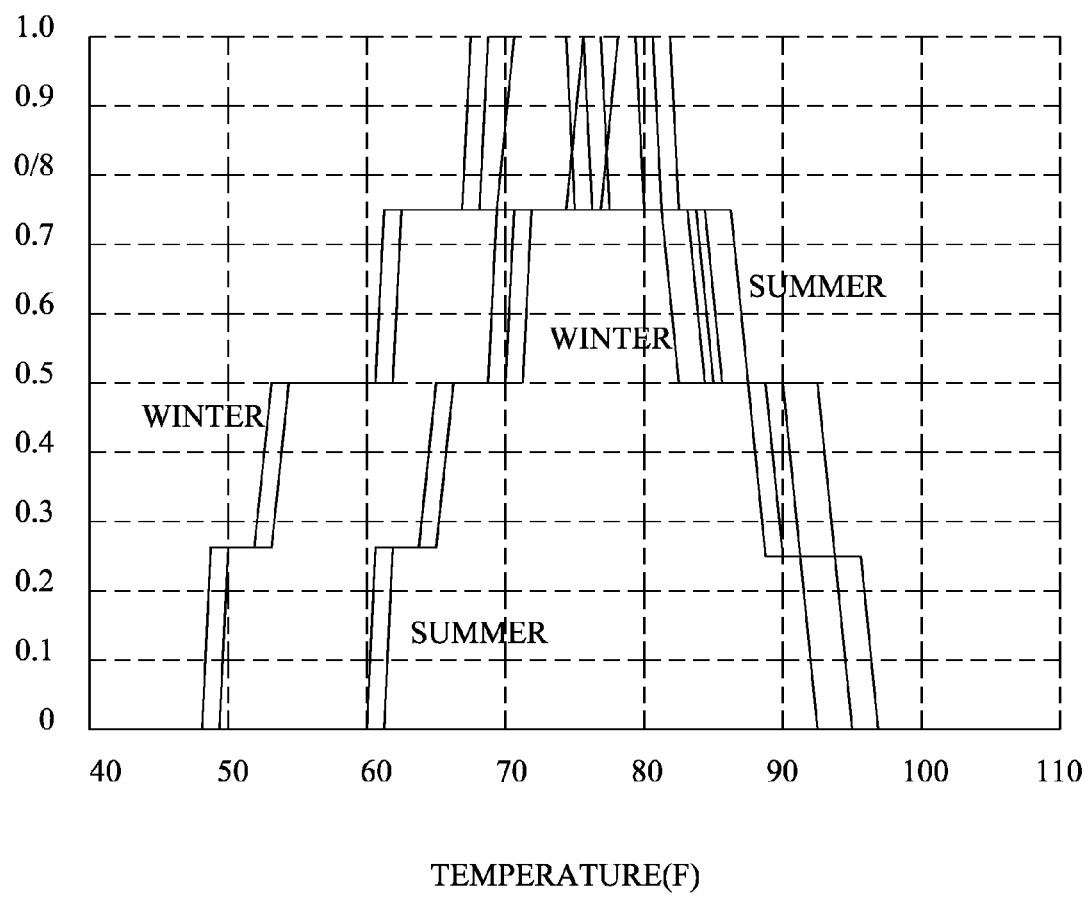
FIG. 19 illustrates thermal comfort functions for a second family.

Another exemplary manner of calculating a thermal comfort function is illustrated below, and shown in FIG. 19. In this case, the thermal function is calculated by providing a "full comfort" value in the case the PMV value is within [−0.5, 0.5]

and the PPD is <10%. A thermal sensation scale may be used to quantize the thermal function value in steps.

```
//pmv = Predicted Mean Vote Index
//ppd = Predicted Percentage of Dissatisfied
//TC = Thermal Comfort Function
for clo=0.5:0.5:1;
    for rh=25:25:75;
        for t=Ti:1:Ti+N;
            TC(t)=1−abs(pmv(t))./3;
            checkAndSetTC(TC(t),pmv(t),ppd(t));
        end;
    end;
end;
checkAndSetTC(TC,pmv,ppd);
{
    if(−0.5<pmv<0.5 && ppd <10));
        TC=1;
    elseif(TC>(1−(1.5/3)));
        TC=0.75;
    elseif(TC>(1−(2.5/3)));
        TC=0.5;
    elseif(TC>(0));
        TC=0.25;
    end;
}
```

Figure 20:
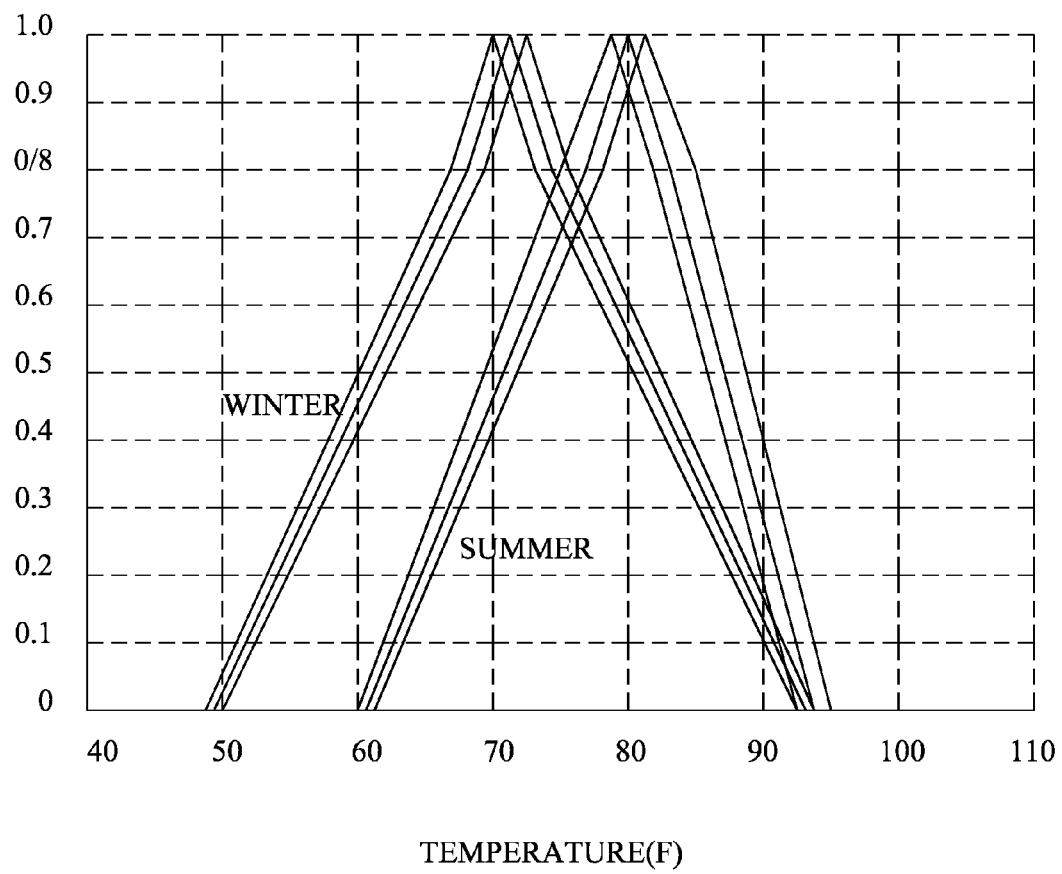
FIG. 20 illustrates thermal comfort functions for a third family.

Another exemplary manner of calculating a thermal comfort function is illustrated below, and shown in FIG. 20.

```
//pmv = Predicted Mean Vote Index
//ppd = Predicted Percentage of Dissatisfied
//TC = Thermal Comfort Function
for clo=0.5:0.5:1;
    for rh=25:25:75;
        for t=Ti:1:Ti+N;
            TC(t)=1−abs(pmv(t))./3;
        end;
    end;
end;
checkAndSetTC(TC,pmv,ppd);
{
    if(−0.5<pmv<0.5 && ppd <10));
        TC=TC;
    end;
}
```

Figure 21:
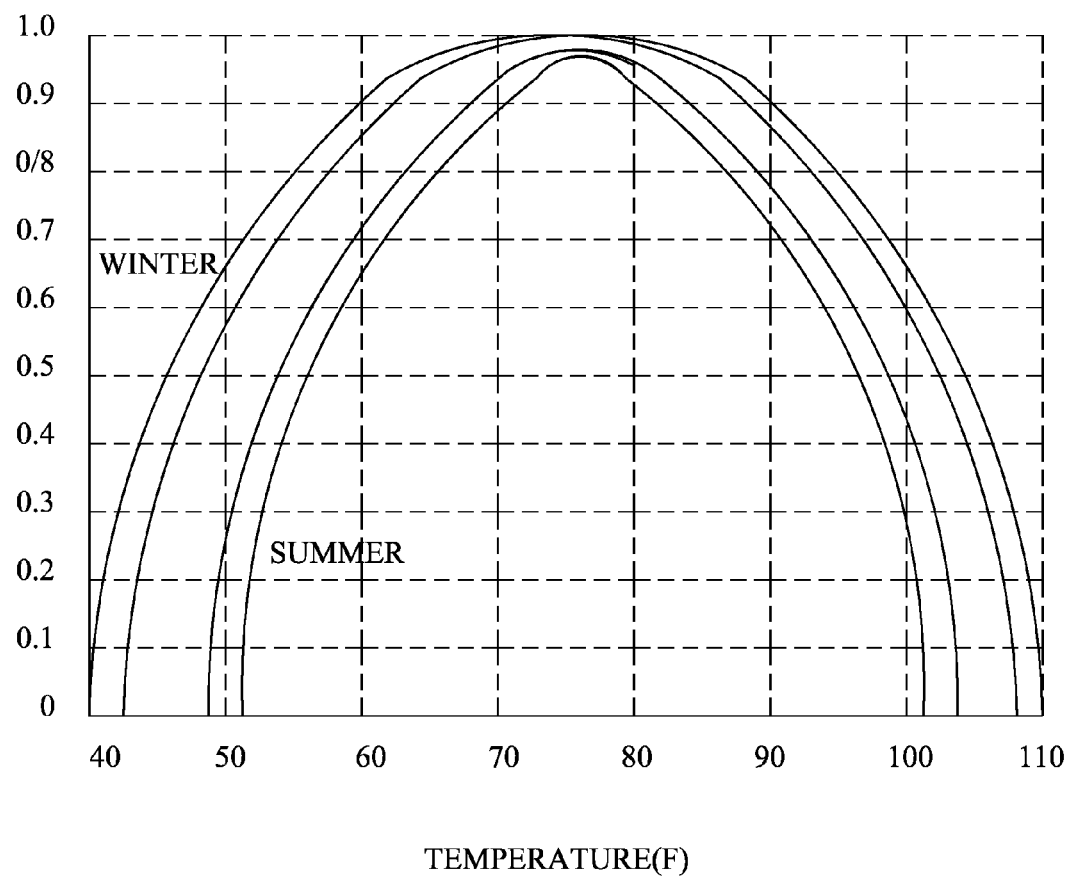
FIG. 21 illustrates thermal comfort functions for a fourth family.

Yet another exemplary manner of calculating a thermal comfort function is illustrated below, and shown in FIG. 21. In this case, the thermal function is calculated by providing a "full comfort" value in the case the PMV value is within [−0.5, 0.5] and the PPD is <10%. The thermal comfort function has a value of 1 (full comfort) when in the band. Outside the full comfort bands the thermal comfort function may be calculated as follows.

Comfort($t$,band)=

$W_L \cdot (t-\min(\text{band}))^\alpha$ $t<\min(\text{band})$ 1 mind(band)≤$t$≤max(band)

$W_H \cdot (\max(\text{band})-t)^\beta$ max(band)<$t$

In some embodiments, the thermal comfort functions from a set of functions may be adapted to a user by translating it along the x-axis, aligning the midpoint of the function with the temperature set point selected by the user, or otherwise modifying it in some manner related to the user's preferences.

The cost comfort tradeoff factor selection for a user may not be intuitively apparent to the user. For example, instead of specifying a cost-comfort tradeoff factor directly, the user may specify a monthly energy bill limit (e.g., in dollars) as the tradeoff factor. This value may be used by the system to determine an empirical cost-comfort tradeoff factor. As will be described, for a cost-constrained model, instead of specifying a cost-comfort tradeoff factor expressly, the user may specify a monthly energy bill limit (e.g., in dollars), from which implicitly determines the cost-comfort tradeoff factor, which is more intuitive and natural for the user. The monthly energy bill limit value may then be used by the system to determine a suitable cost-comfort tradeoff-factor. Also, the technique may adapt the cost-comfort tradeoff factor as desired e.g., such as daily) based upon the actual energy used, which provides an adaptation capability for the thermostat.

Figure 22:
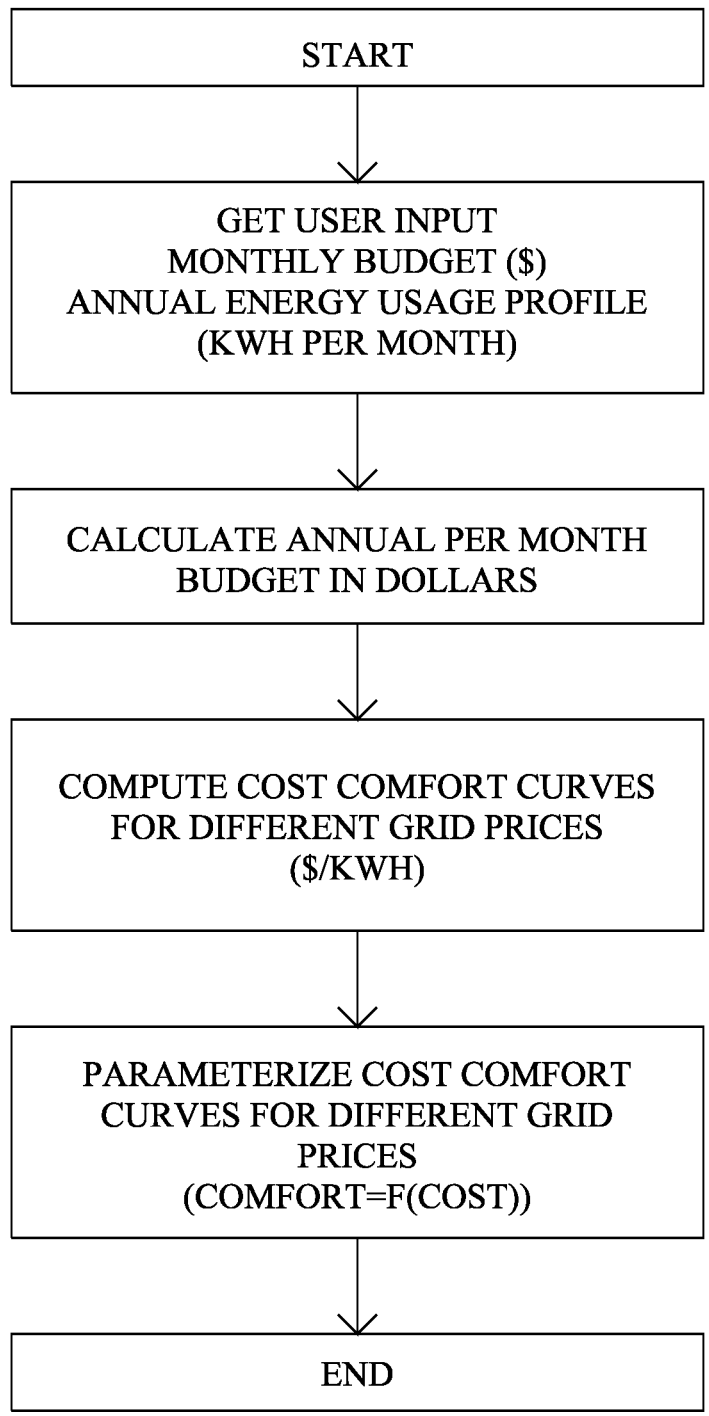
FIG. 22 illustrates a technique for determining cost comfort.
Figure 23:
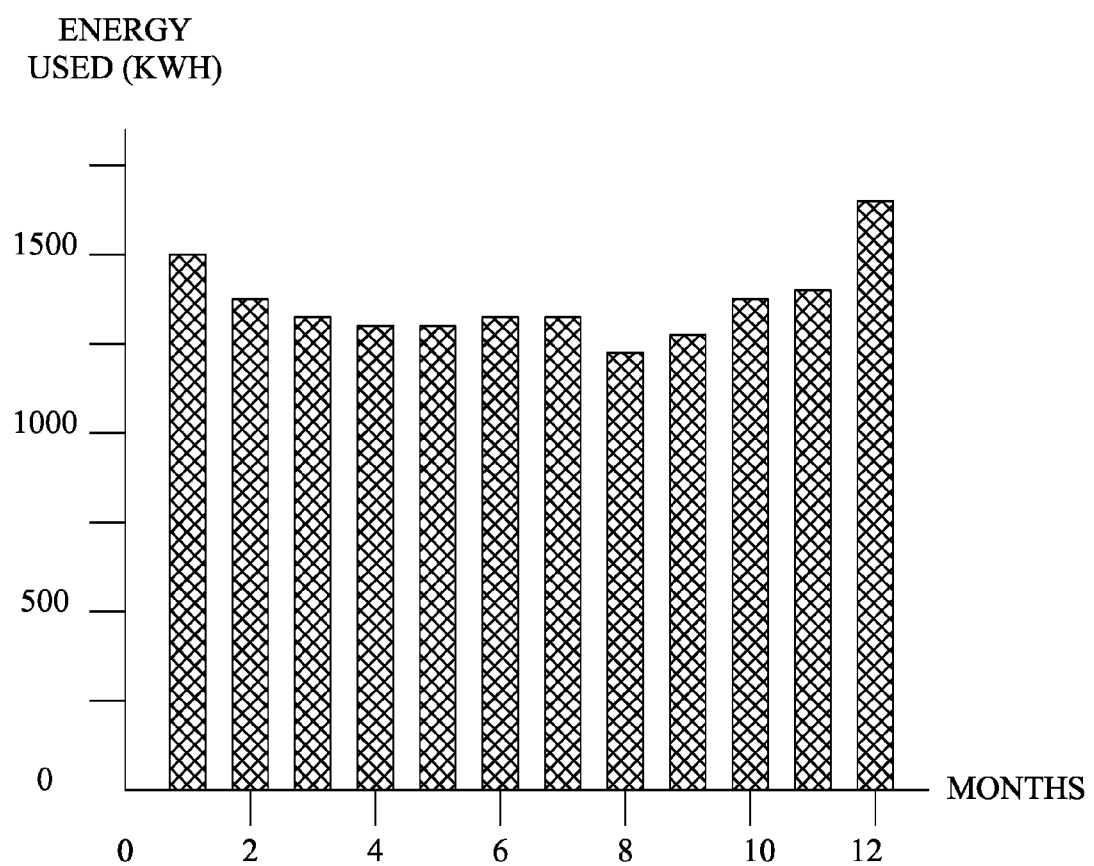
FIG. 23 illustrates user's annual energy usage profile.
Figure 24:
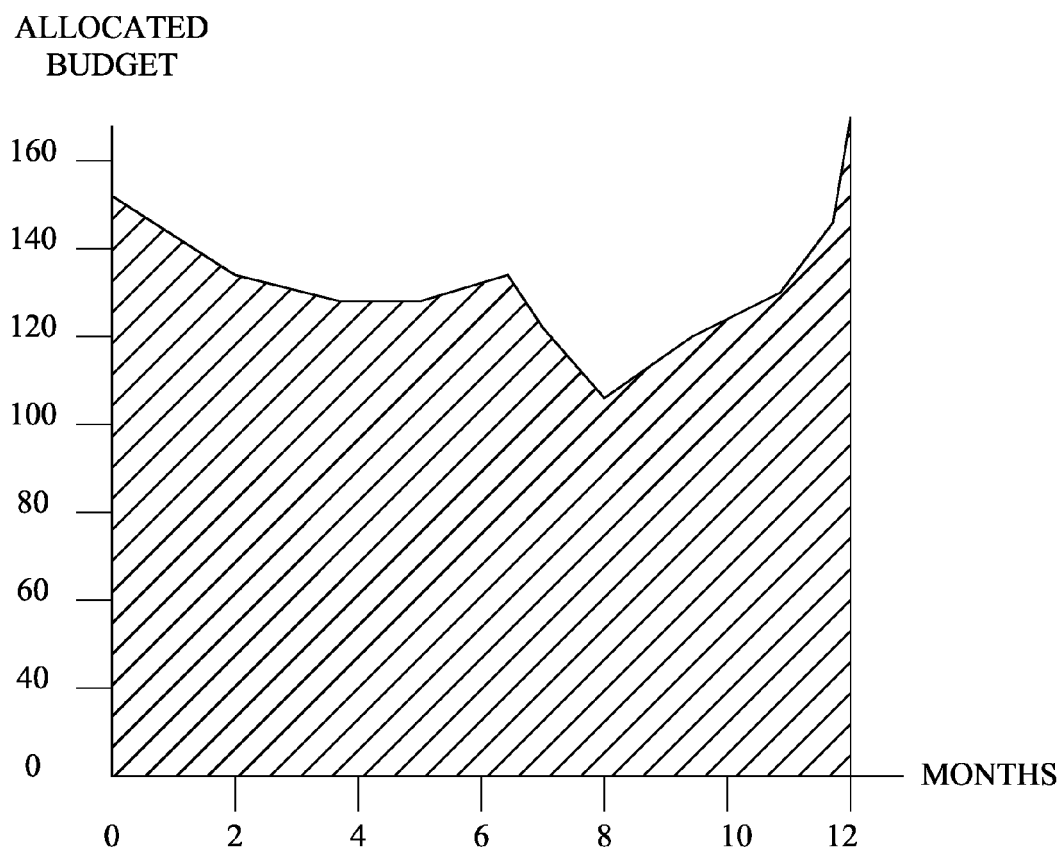
FIG. 24 illustrates annual per month budget.
Figure 25:
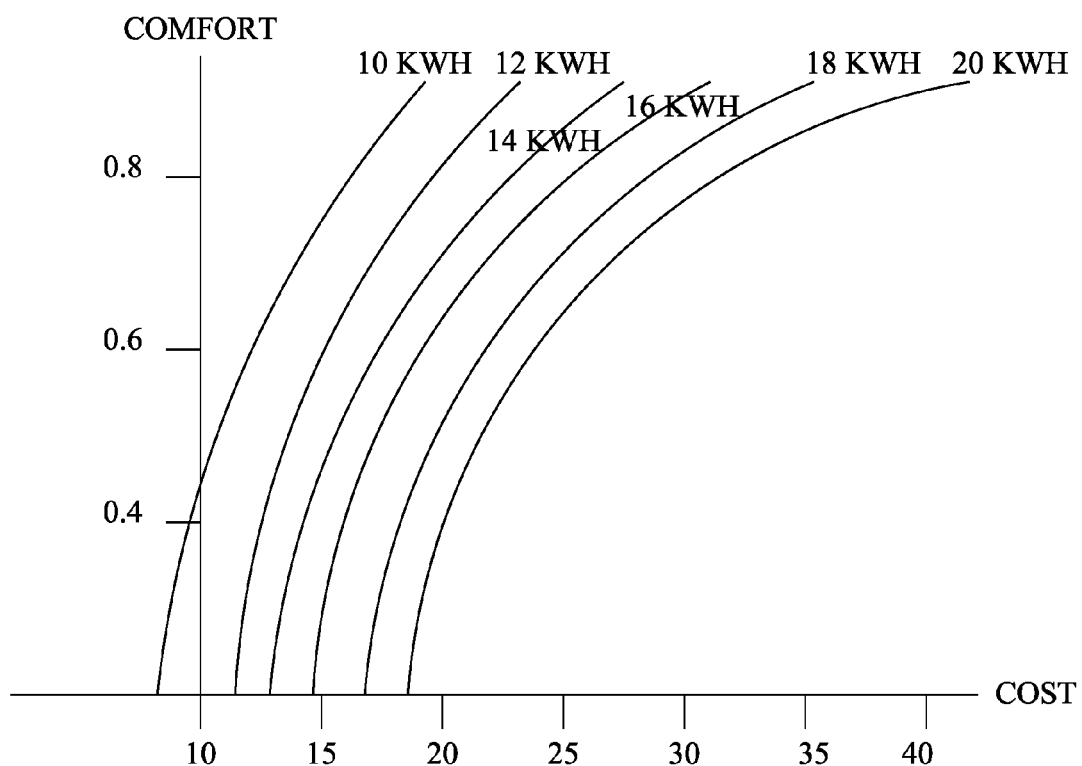
FIG. 25 illustrates cost-comfort curves.
Figure 26:
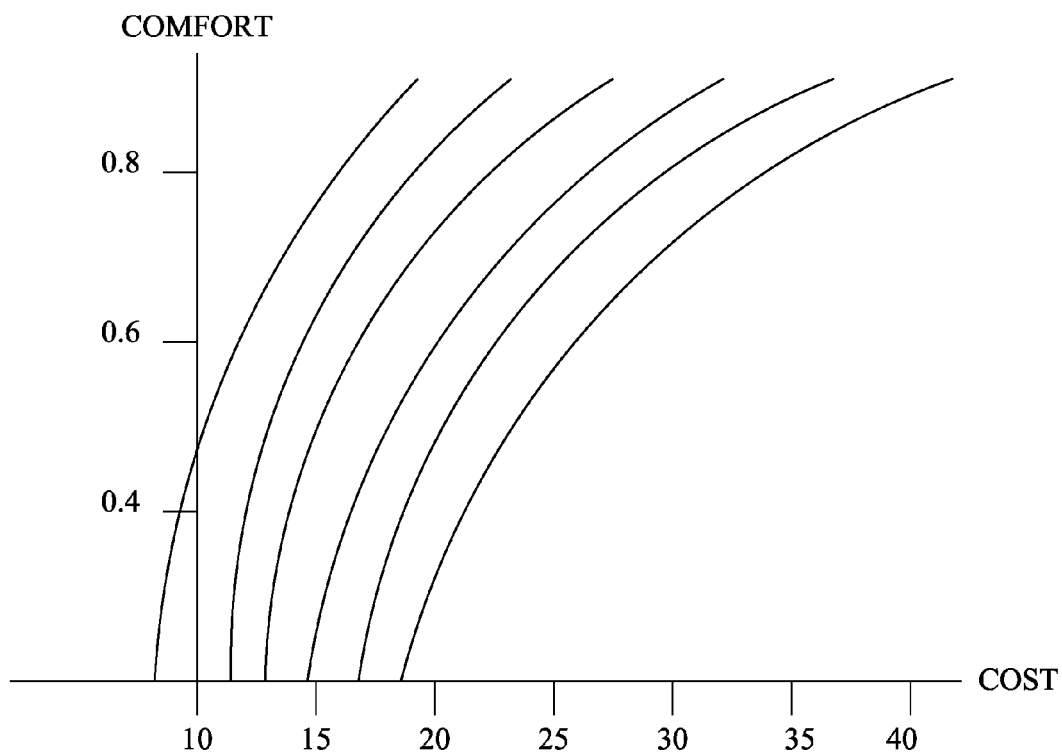
FIG. 26 illustrates quadratic fits for cost comfort curves.

Referring to FIG. 22, the user or otherwise data transmitted across a network, the system obtains monthly billing information. Referring to FIG. 23, based upon the monthly billing for a particular month, or based upon multiple monthly bills, the system may determine or otherwise calculate, the user's annual energy usage profile on a per month basis. Referring to FIG. 24, based upon the monthly billing, based upon monthly bills, or otherwise, the system may determine or otherwise calculate, the user's annual budget, monthly budget, or otherwise. Referring to FIG. 25, the system may compute cost-comfort curves based upon the various grid prices for different values of the cost-comfort tradeoff factor; $f(\lambda,t)=\lambda*\text{Comfort}(t)+(1-\lambda)*\text{Cost}(t)$. Then based upon the cost-comfort curves, referring to FIG. 26, the system may parameterize the cost-comfort curves, such as using quadratic fit equations for the different grid prices.

Figure 27:
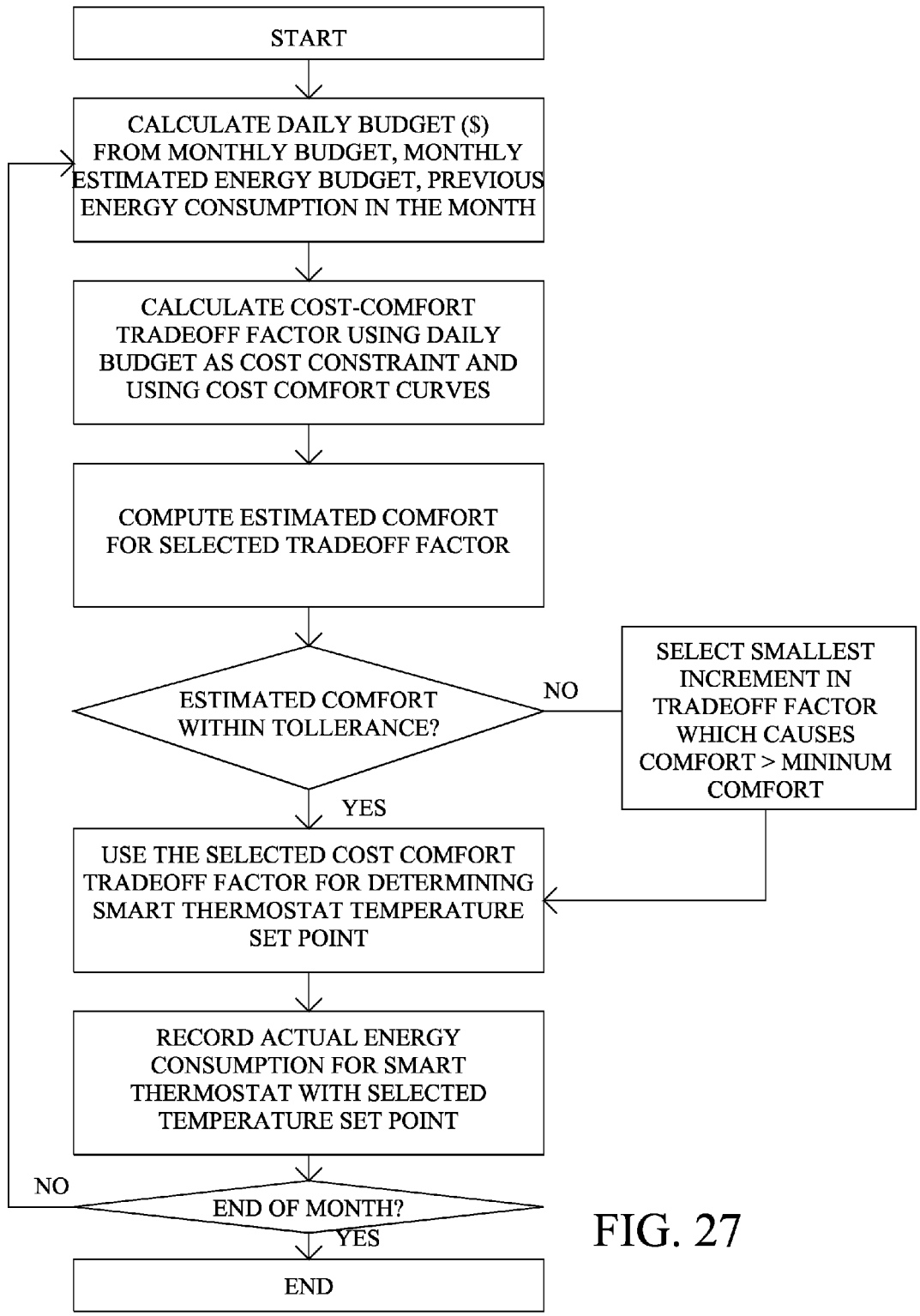
FIG. 27 illustrates calculating cost-comfort tradeoff factor.
Figure 28:
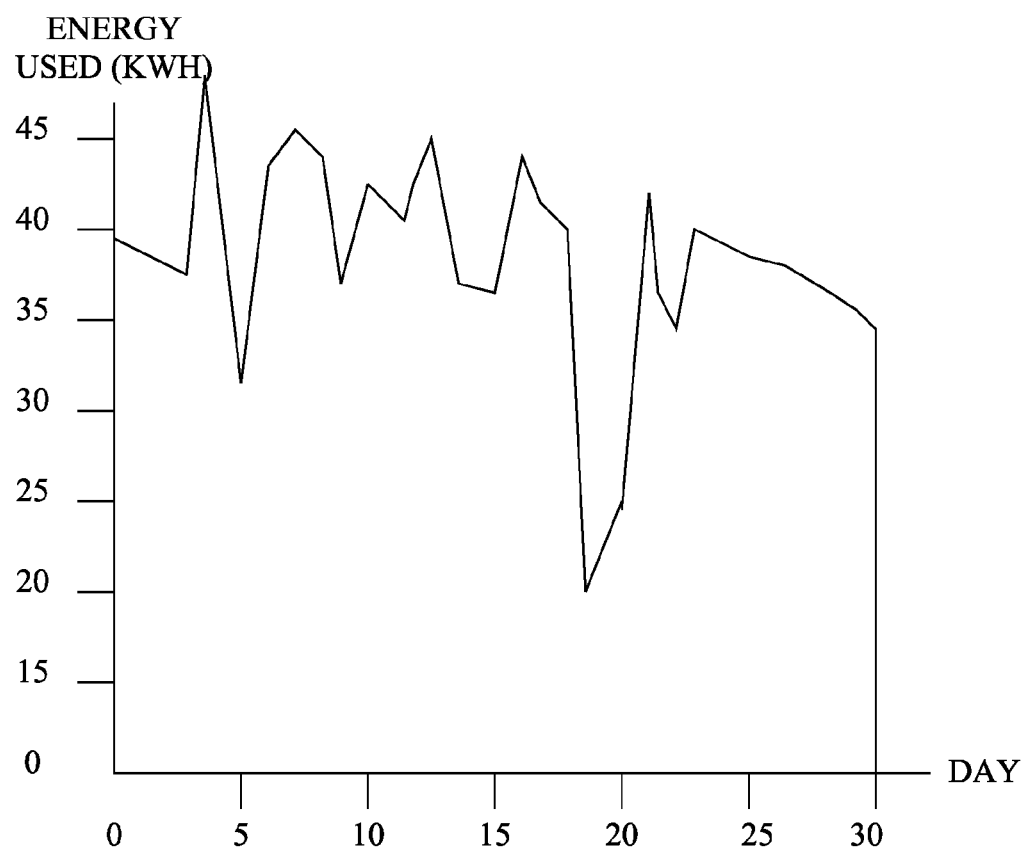
FIG. 28 illustrates daily energy usage.
Figure 29:
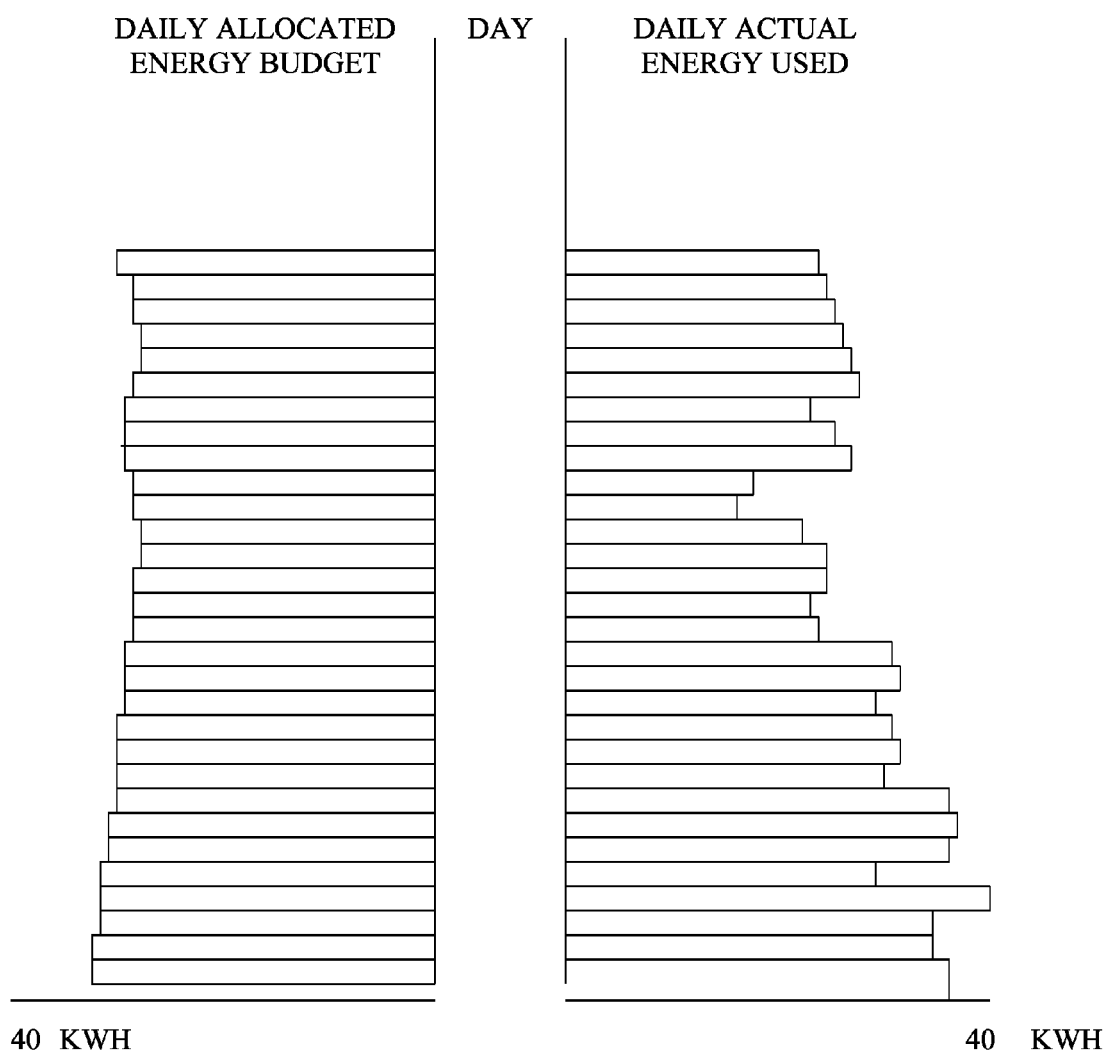
FIG. 29 illustrates daily allocation budget versus daily used.
Figure 30:
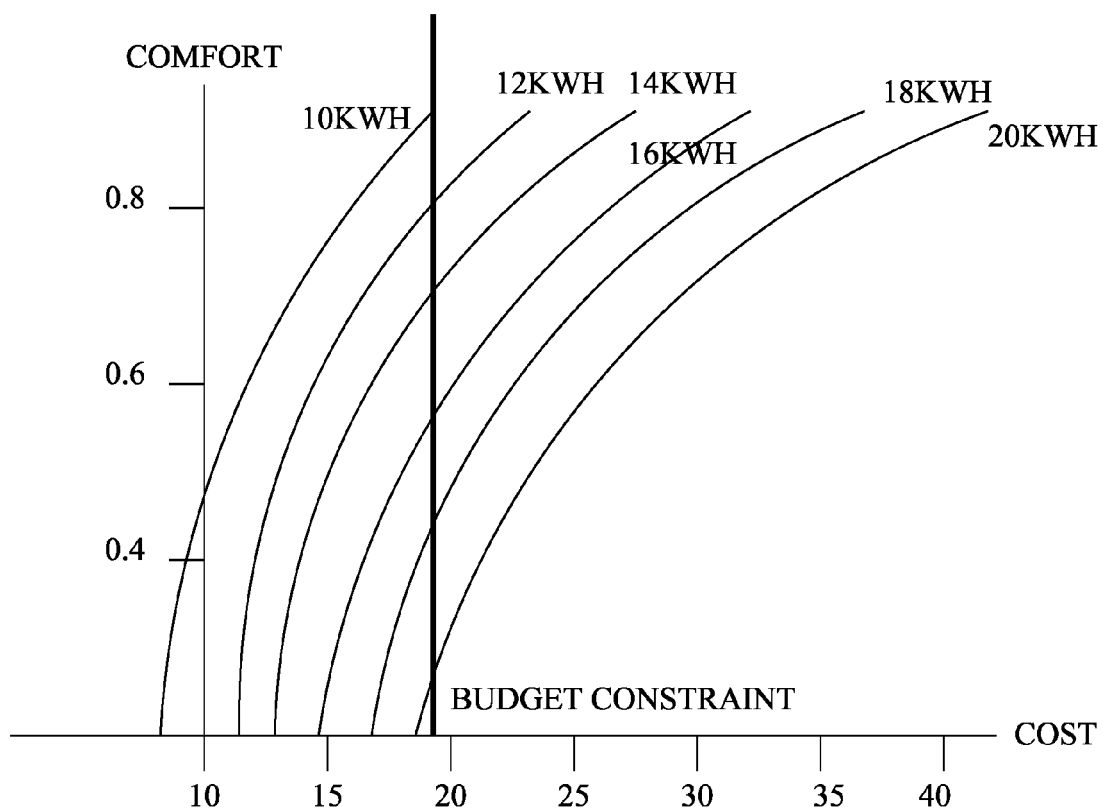
FIG. 30 illustrates a computation of cost-comfort tradeoff factor.

Referring to FIG. 27, using some or all of the information previously calculated, the system may calculate a daily budget from the monthly budget, may calculate a monthly estimated energy budget (see FIG. 28), and track previous energy consumption for the month (see FIG. 29). Referring to FIG. 30, based upon this information, the system may calculate a cost-comfort tradeoff factor using the daily budge as a cost constraint and using the cost-comfort curves. Referring again to FIG. 27, the system may check if the comfort is within tolerance levels, if not then select the smallest cost-comfort tradeoff factor which causes the comfort to be greater than a minimum. In either case, the selected cost-comfort tradeoff factor is used to determine a suitable thermostat temperature set point. The actual energy usage for the month and selected set points are recorded for the month. The system may record this information for the month for historical basis, and for computing other times periods, and the process is repeated for additional months.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:
1. An energy management system:
 (a) a computing device comprising a controller that receives a signal representative of an electrical generation source of a customer that generates electricity which is separate and apart from power provided by an electrical utility;
 (b) a battery capable of storing electricity from said electrical generation source associated with said controller;
 (c) said controller predicting variations in the amount of electricity stored in said battery source over a time interval;

(d) said controller receiving pricing information for electricity not provided from said electrical generation source;

(f) said controller including a model of a temperature system of a building;

(g) said controller including a comfort model of a user indicating the amount of discomfort said user considers appropriate based upon a cost associated with said pricing information for whether said controller determines to provide an actual temperature different than a desirable temperature selected by said user;

(h) said controller selecting a said desirable temperature, while providing said actual temperature, based upon said electrical generation source, said amount of electricity stored in said battery, pricing information, said model of a temperature system, and said comfort model.

2. The energy management system of claim 1 wherein said controller receives a temporal input including at least one of time, day, and season.

3. The energy management system of claim 1 wherein said electrical generation source includes at least one of a photovoltaic source, a water source, a wind source, an ocean source, a geothermal source, and a generator source.

4. The energy management system of claim 1 wherein said amount of energy electricity is based upon historical information.

5. The energy management system of claim 4 wherein said amount of electricity is based upon local weather.

6. The energy management system of claim 1 wherein said pricing information includes at least one of current pricing, historical pricing, future pricing, and time of day.

7. The energy management system of claim 1 wherein said controller receives at least one of an outdoor humidity input and an outdoor temperature input.

8. The energy management system of claim 1 wherein said controller receives a desired indoor temperature.

9. The energy management system of claim 8 wherein said desired indoor temperature is temporal based.

10. The energy management system of claim 1 wherein said model of a temperature system is based upon an outdoor temperature, an indoor temperature, parameters of said building, and a target temperature.

11. The energy management system of claim 1 wherein said comfort model is user adjustable.

12. The energy management system of claim 1 wherein said controller includes a tradeoff factor for said pricing and said comfort.

13. The energy management system of claim 1 wherein said controller receives a demand response event.

14. The energy management system of claim 12 wherein said tradeoff factor for said pricing and said comfort is based on a monthly electricity bill limit input from user.

* * * * *